United States Patent
Hong et al.

(10) Patent No.: US 10,785,272 B2
(45) Date of Patent: Sep. 22, 2020

(54) STREAMING APPLICATION UPGRADING METHOD, MASTER NODE, AND STREAM COMPUTING SYSTEM

(71) Applicant: Huawei Technologies Co., Ltd., Shenzhen (CN)

(72) Inventors: Sibao Hong, Hangzhou (CN);
Mingzhen Xia, Hangzhou (CN);
Songshan Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 15/492,392

(22) Filed: Apr. 20, 2017

(65) Prior Publication Data

US 2017/0223075 A1    Aug. 3, 2017

Related U.S. Application Data

(63) Continuation of application No. PCT/CN2015/079944, filed on May 27, 2015.

(30) Foreign Application Priority Data

Oct. 22, 2014    (CN) .......................... 2014 1 0568236

(51) Int. Cl.
    *H04L 29/06*      (2006.01)
    *G06F 8/65*      (2018.01)
    (Continued)

(52) U.S. Cl.
    CPC ............ *H04L 65/4069* (2013.01); *G06F 8/65* (2013.01); *G06F 16/00* (2019.01); *H04L 67/10* (2013.01)

(58) Field of Classification Search
    CPC .................................................. H04L 65/4069
    (Continued)

(56) References Cited

U.S. PATENT DOCUMENTS 5,815,707 A * 9/1998 Krause ...................... G06F 9/54
                                                      719/321
7,185,075 B1 * 2/2007 Mishra .................... H04L 41/00
                                                   379/207.01

(Continued)

FOREIGN PATENT DOCUMENTS

CN      101126987 A      2/2008
CN      101162428 A      4/2008
(Continued)

OTHER PUBLICATIONS

Dullien et al., "Graph-based comparison of Executable Objects", 2005 (Year: 2005).*

(Continued)

*Primary Examiner* — Ondrej C Vostal
(74) *Attorney, Agent, or Firm* — Conley Rose, P.C.

(57) ABSTRACT

A streaming application upgrading method and a stream computing system, where the method includes obtaining a updated logical model of a streaming application, determining a to-be-adjusted stream by comparing the updated logical model with an initial logical model, generating an upgrading instruction according to the to-be-adjusted stream, and delivering the generated upgrading instruction to a worker node such that the worker node adjusts, according to an indication of the upgrading instruction, a stream between process elements (PEs) distributed on the worker node. The method provided in the present disclosure can upgrade the streaming application online without interrupting a service.

19 Claims, 13 Drawing Sheets

(51) Int. Cl.
*G06F 16/00* (2019.01)
*H04L 29/08* (2006.01)

(58) Field of Classification Search
USPC .......................................................... 709/219
See application file for complete search history.

(56) References Cited

U.S. PATENT DOCUMENTS

| | | | |
|---|---|---|---|
| 7,346,480 B1* | 3/2008 | Pekarek | G06F 17/5036 326/30 |
| 7,765,255 B2 | 7/2010 | Cherdron et al. | |
| 7,921,424 B2 | 4/2011 | Shutt et al. | |
| 8,112,541 B2* | 2/2012 | Amini | G06F 9/4494 709/231 |
| 8,244,932 B2* | 8/2012 | Amini | H04L 29/06027 370/229 |
| 8,429,287 B2* | 4/2013 | Sullivan | H04N 7/24 370/213 |
| 8,862,743 B1 | 10/2014 | Petrescu-Prahova | G06F 9/54 709/219 |
| 8,868,963 B2* | 10/2014 | Fawcett | G06F 9/5061 709/223 |
| 2007/0255941 A1* | 11/2007 | Ellis | H04L 9/0662 713/151 |
| 2007/0261041 A1* | 11/2007 | Amini | G06F 9/4494 717/148 |
| 2007/0299980 A1* | 12/2007 | Amini | H04L 47/10 709/231 |
| 2008/0256528 A1 | 10/2008 | Waitzmann et al. | |
| 2008/0304516 A1* | 12/2008 | Feng | G06F 9/5038 370/468 |
| 2010/0281178 A1* | 11/2010 | Sullivan | H04N 7/24 709/231 |
| 2010/0287204 A1* | 11/2010 | Amini | G06F 11/3072 707/802 |
| 2011/0119395 A1* | 5/2011 | Ha | H04N 21/812 709/231 |
| 2011/0238855 A1* | 9/2011 | Korsunsky | G06F 21/55 709/231 |
| 2011/0299404 A1* | 12/2011 | Shaffer | H04H 20/59 370/241 |
| 2013/0031335 A1* | 1/2013 | Santosuosso | G06F 15/17 712/30 |
| 2013/0167133 A1 | 6/2013 | Cao et al. | |
| 2014/0059185 A1* | 2/2014 | Siripurapu | G06F 17/30864 709/219 |
| 2014/0164628 A1* | 6/2014 | Branson | G06F 9/54 709/227 |
| 2014/0280771 A1* | 9/2014 | Bosworth | G06F 12/0875 709/219 |
| 2015/0280959 A1* | 10/2015 | Vincent | G06F 16/1774 709/203 |
| 2016/0154896 A1* | 6/2016 | Simitsis | G06F 16/2372 707/741 |
| 2016/0373494 A1 | 12/2016 | Shi et al. | |

FOREIGN PATENT DOCUMENTS

| | | |
|---|---|---|
| CN | 102750330 A | 10/2012 |
| CN | 103763378 A | 4/2014 |
| CN | 103796041 A | 5/2014 |
| CN | 103870340 A | 6/2014 |
| CN | 104050261 A | 9/2014 |
| CN | 104317556 A | 1/2015 |
| WO | 2014117353 A1 | 8/2014 |

OTHER PUBLICATIONS

Foreign Communication From a Counterpart Application, European Application No. 15853083.2, Extended European Search Report dated Oct. 11, 2017, 8 pages.
Machine Translation and Abstract of Chinese Publication No. CN101162428, Apr. 16, 2008, 9 pages.
Machine Translation and Abstract of Chinese Publication No. CN102750330, Oct. 24, 2012, 7 pages.
Machine Translation and Abstract of Chinese Publication No. CN103763378, Apr. 30, 2014, 16 pages.
Machine Translation and Abstract of Chinese Publication No. CN103796041, May 14, 2014, 9 pages.
Machine Translation and Abstract of Chinese Publication No. CN104050261, Sep. 17, 2014, 8 pages.
Machine Translation and Abstract of Chinese Publication No. CN104317556, Jan. 28, 2015, 33 pages.
Da-Wei, S., et al., "Big Data Stream Computing; Technologies and Instances," Journal of Software, vol. 25, No. 4, Apr. 2014, pp. 839-862.
Foreign Communication From a Counterpart Application, Chinese Application No. 201410568236.5, Chinese Office Action dated Jul. 6, 2016, 7 pages.
Foreign Communication From a Counterpart Application, Chinese Application No. 201410568236.5, Chinese Search Report dated Jun. 25, 2016, 2 pages.
Foreign Communication From a Counterpart Application, PCT Application No. PCT/CN2015/079944, English Translation of International Search Report dated Aug. 21, 2015, 3 pages.
Foreign Communication From a Counterpart Application, PCT Application No. PCT/CN2015/079944, English Translation of Written Opinion dated Aug. 21, 2015, 3 pages.

* cited by examiner

STREAMING APPLICATION UPGRADING METHOD, MASTER NODE, AND STREAM COMPUTING SYSTEM

CROSS-REFERENCE TO RELATED APPLICATIONS

This application is a continuation of International Patent Application No. PCT/CN2015/079944 filed on May 27, 2015, which claims priority to Chinese Patent Application No. 201410568236.5 filed on Oct. 22, 2014. The disclosures of the aforementioned applications are hereby incorporated by reference in their entireties.

TECHNICAL FIELD

The present disclosure relates to the field of computer technologies, and in particular, to a streaming application upgrading method, a master node, and a stream computing system.

BACKGROUND

With arrival of the big data era, market demands for performing real-time processing, analysis, and decision-making on mass data continuously expand, such as precise advertisement push in the field of telecommunications, dynamic real-time analysis on transaction in the field of finances, and real-time monitoring in the field of industries. Against this backdrop, a data-intensive application such as financial service, network monitoring, or telecommunications data management, is applied increasingly widely, and a stream computing system applicable to the data-intensive application also emerges. Data generated by the data-intensive application is characterized by a large amount of data, a high speed, and time variance, and after the data-intensive application is deployed in the stream computing system, the stream computing system may immediately process the data of the application upon receiving it, to ensure real-time performance. As shown in FIG. 1, a stream computing system generally includes a master node and multiple worker nodes, where the master node is mainly responsible for scheduling and managing each worker node, the worker node is a logical entity carrying an actual data processing operation, the worker node further processes data by invoking several process elements (PEs), and a PE is a physical process element of service logic.

Generally, an application program or a service deployed in the stream computing system is referred to as a streaming application. In other approaches, when a streaming is deployed in the stream computing system, a logical model of the streaming application needs be defined in advance, and the logical model of the streaming application is generally denoted using a directed acyclic graph (DAG). As shown in FIG. 2, a PE is a physical carrier carrying an actual data processing operation, and is also a minimum unit that may be scheduled and executed by the stream computing system. A stream represents a data stream transmitted between PEs, and an arrow denotes a direction of a data stream. A PE may load and execute service logic dynamically, and process data of the streaming application in real time. As shown in FIG. 3, a stream computing system deploys PEs on different worker nodes for execution according to a logical model, and each PE performs computing according to logic of the PE, and forwards a computing result to a downstream PE. However, when a user demand or a service scenario changes, the streaming application needs to be updated or upgraded, and the initial logical model is no longer applicable. Therefore, first, updating of the streaming application needs to be completed offline, and a new logical model is defined. Then the old application is stopped, an updated streaming application is deployed in the stream computing system according to the new logical model, and finally the updated streaming application is started. It can be seen that, in other approaches, a service needs to be interrupted to update the streaming application. Therefore, the streaming application cannot be upgraded online, causing a service loss.

SUMMARY

Embodiments of the present disclosure provide a streaming application upgrading method, a master node, and a stream computing system, which are used to upgrade a streaming application in a stream computing system online without interrupting a service.

According to a first aspect, an embodiment of the present disclosure provides a streaming application upgrading method, where the method is applied to a master node in a stream computing system, and the stream computing system includes the master node and at least one worker node, where multiple PEs are distributed on one or more worker nodes of the at least one worker node, and are configured to process data of a streaming application deployed in the stream computing system, where an initial logical model of the streaming application denotes the multiple PEs processing the data of the streaming application and a direction of a data stream between the multiple PEs, and the method includes obtaining, by the master node, an updated logical model of the streaming application, and determining a to-be-adjusted data stream by comparing the initial logical model of the streaming application with the updated logical model when the streaming application is updated, generating an upgrading instruction according to the to-be-adjusted data stream, and delivering the upgrading instruction to a first worker node, where the first worker node is a worker node at which a PE related to the to-be-adjusted data stream is located, and the upgrading instruction instructs the first worker node to adjust a direction of a data stream between PEs distributed on the first worker node.

In a first possible implementation manner of the first aspect, determining a to-be-adjusted data stream by comparing the initial logical model of the streaming application with the updated logical model includes comparing the initial logical model of the streaming application with the updated logical model, to determine the to-be-adjusted data stream, where the PEs denoted by the initial logical model of the streaming application are the same as PEs denoted by the updated logical model.

In a second possible implementation manner of the first aspect, determining a to-be-adjusted data stream by comparing the initial logical model of the streaming application with the updated logical model includes comparing the initial logical model of the streaming application with the updated logical model, to determine a to-be-adjusted PE and the to-be-adjusted data stream, where the PEs denoted by the initial logical model of the streaming application are not completely the same as PEs denoted by the updated logical model. Generating an upgrading instruction according to the to-be-adjusted data stream includes generating a first upgrading instruction according to the to-be-adjusted data stream, and generating a second upgrading instruction according to the to-be-adjusted PE. Delivering the upgrading instruction to a first worker node includes delivering the first upgrading instruction to the first worker node, and delivering the second upgrading instruction to a second worker node, where the second worker node includes a worker node at which the to-be-adjusted PE is located, and the first upgrading instruction instructs the first worker node to adjust the direction of the data stream between the PEs distributed on the first worker node, and the second upgrading instruction instructs the second worker node to adjust a quantity of PEs distributed on the second worker node.

With reference to the first aspect, or either of the first and second possible implementation manners of the first aspect, in a third possible implementation manner, the method further includes determining, by the master node according to a dependency relationship between an input stream and an output stream of the PE related to the to-be-adjusted data stream, a target PE that needs to perform data recovery and a checkpoint for the target PE performing data recovery, delivering a data recovery instruction to a worker node at which the target PE is located, where the data recovery instruction instructs the target PE to recover data according to the checkpoint, and triggering, by the master node, the target PE to input the recovered data to a downstream PE of the target PE for processing after the first worker node completes adjustment, and the PEs distributed on the first worker node get ready.

With reference to the third possible implementation manner of the first aspect, in a fourth possible implementation manner, the to-be-adjusted data stream includes a to-be-updated data stream and a to-be-deleted data stream, and determining, by the master node according to a dependency relationship between an input stream and an output stream of the PE related to the to-be-adjusted data stream, a target PE that needs to perform data recovery and a checkpoint for the target PE performing data recovery includes determining, by the master node according to status data of a PE related to the to-be-updated data stream and the to-be-deleted data stream, a checkpoint for performing data recovery, and determining, according to a dependency relationship between an input stream and an output stream of the PE related to the to-be-updated data stream and the to-be-deleted data stream, a target PE that needs to perform data recovery, where status data of each PE is backed up by the PE when being triggered by an output event, and indicates a status in which the PE processes data.

With reference to any one of the second to fourth possible implementation manners of the first aspect, in a fifth possible implementation manner, the to-be-adjusted PE includes a to-be-added PE. The second worker node is a worker node selected by the master node according to a load status of each worker node in the stream computing system, and the second upgrading instruction instructs the second worker node to create the to-be-added PE.

With reference to any one of the second to fifth possible implementation manners of the first aspect, in a sixth possible implementation manner, the to-be-adjusted PE includes a to-be-deleted PE. The second worker node is a worker node at which the to-be-deleted PE is located, and the second upgrading instruction instructs the second worker node to delete the to-be-deleted PE.

With reference to the first aspect, or any one of the first to sixth possible implementation manners of the first aspect, in a seventh possible implementation manner, the method further includes configuring the multiple PEs according to the initial logical model of the streaming application such that the multiple PEs process the data of the streaming application.

With reference to the first aspect, or any one of the first to seventh possible implementation manners of the first aspect, in an eighth possible implementation manner, the initial logical model of the streaming application is denoted using a DAG.

According to a second aspect, an embodiment of the present disclosure provides a master node in a stream computing system, where the stream computing system includes the master node and at least one worker node, where multiple PEs are distributed on one or more worker nodes of the at least one worker node, and are configured to process data of a streaming application deployed in the stream computing system, where an initial logical model of the streaming application is used to denote the multiple PEs processing the data of the streaming application and a direction of a data stream between the multiple PEs, and the master node includes an obtaining and determining module configured to obtain an updated logical model of the streaming application, and determine a to-be-adjusted data stream by comparing the initial logical model of the streaming application with the updated logical model when the streaming application is updated, an upgrading instruction generating module configured to generate an upgrading instruction according to the to-be-adjusted data stream, and a sending module configured to deliver the upgrading instruction to a first worker node, where the first worker node is a worker node at which a PE related to the to-be-adjusted data stream is located, and the upgrading instruction instructs the first worker node to adjust a direction of a data stream between PEs distributed on the first worker node.

In a first possible implementation manner of the second aspect, the obtaining and determining module is further configured to compare the initial logical model of the streaming application with the updated logical model, to determine the to-be-adjusted data stream, where the PEs denoted by the initial logical model of the streaming application are the same as PEs denoted by the updated logical model.

In a second possible implementation manner of the second aspect, the obtaining and determining module is further configured to compare the initial logic model of the streaming application with the updated logic model, to determine a to-be-adjusted PE and the to-be-adjusted data stream, and where the PEs denoted by the initial logical model of the streaming application are not completely the same as PEs denoted by the updated logical model. The upgrading instruction generating module is further configured to generate a first upgrading instruction according to the to-be-adjusted data stream, and generating a second upgrading instruction according to the to-be-adjusted PE, and the sending module is further configured to deliver the first upgrading instruction to the first worker node, and deliver the second upgrading instruction to a second worker node, where the second worker node includes a worker node at which the to-be-adjusted PE is located, and the first upgrading instruction instructs the first worker node to adjust the direction of the data stream between the PEs distributed on the first worker node, and the second upgrading instruction instructs the second worker node to adjust a quantity of PEs distributed on the second worker node.

With reference to the second aspect, or either of the first and second possible implementation manners of the second aspect, in a third possible implementation manner, the master node further includes a data recovery module configured to determine, according to a dependency relationship between an input stream and an output stream of the PE related to the to-be-adjusted data stream, a target PE that needs to perform data recovery and a checkpoint for the target PE performing data recovery, where the sending module is further configured to deliver a data recovery instruction to a worker node at which the target PE is located, where the data recovery instruction instructs the target PE to recover data according to the checkpoint, and the master node further includes an input triggering module configured to trigger the target PE to input the recovered data to a downstream PE of the target PE for processing after the first worker node completes adjustment, and the PEs distributed on the first worker node get ready.

With reference to the third possible implementation manner of the second aspect, in a fourth possible implementation manner, the to-be-adjusted data stream includes a to-be-updated data stream and a to-be-deleted data stream, and the data recovery module is further configured to determine, according to status data of a PE related to the to-be-updated data stream and the to-be-deleted data stream, a checkpoint for performing data recovery, and determine, according to a dependency relationship between an input stream and an output stream of the PE related to the to-be-updated data stream and the to-be-deleted data stream, a target PE that needs to perform data recovery, where status data of each PE is backed up by the PE when being triggered by an output event, and indicates a status in which the PE processes data.

With reference to any one of the second to fourth possible implementation manners of the second aspect, in a fifth possible implementation manner, the to-be-adjusted PE includes a to-be-deleted PE. The second worker node is a worker node at which the to-be-deleted PE is located, and the second upgrading instruction instructs the second worker node to delete the to-be-deleted PE.

With reference to any one of the second to fifth possible implementation manners of the second aspect, in a sixth possible implementation manner, the to-be-adjusted PE includes a to-be-added PE. The second worker node is a worker node selected by the master node according to a load status of each worker node in the stream computing system, and the second upgrading instruction instructs the second worker node to create the to-be-added PE.

With reference to the second aspect, or any one of the first to sixth possible implementation manners of the second aspect, in a seventh possible implementation manner, the master node further includes a configuration module configured to configure the multiple PEs according to the initial logical model of the streaming application such that the multiple PEs process the data of the streaming application.

According to a third aspect, an embodiment of the present disclosure provides a stream computing system, including a master node and at least one worker node, where multiple PEs are distributed on one or more worker nodes of the at least one worker node, and are configured to process data of a streaming application deployed in the stream computing system, where an initial logical model of the streaming application denotes the multiple PEs processing the data of the streaming application and a direction of a data stream between the multiple PEs, and the master node is configured to obtain an updated logical model of the streaming application, and determine a to-be-adjusted data stream by comparing the initial logical model of the streaming application with the updated logical model when the streaming application is updated, generate an upgrading instruction according to the to-be-adjusted data stream, and deliver the upgrading instruction to a first worker node, where the first worker node is a worker node at which a PE related to the to-be-adjusted data stream is located, and the upgrading instruction instructs the first worker node to adjust a direction of a data stream between PEs distributed on the first worker node, and the first worker node is configured to receive the upgrading instruction sent by the master node, and adjust, according to an indication of the upgrading instruction, the direction of the data stream between the PEs distributed on the first worker node.

In a first possible implementation manner of the third aspect, where the PEs denoted by the initial logical model of the streaming application are the same as PEs denoted by the updated logical model.

In a second possible implementation manner of the third aspect, where the PEs denoted by the initial logical model of the streaming application are not completely the same as PEs denoted by the updated logical model, generate a first upgrading instruction according to the to-be-adjusted data stream, and generate a second upgrading instruction according to the to-be-adjusted PE, and deliver the first upgrading instruction to the first worker node, and deliver the second upgrading instruction to a second worker node, where the second worker node includes a worker node at which the to-be-adjusted PE is located. The first worker node is further configured to receive the first upgrading instruction sent by the master node, and adjust, according to an indication of the first upgrading instruction, the direction of the data stream between the PEs distributed on the first worker node, and the second worker node is further configured to receive the second upgrading instruction sent by the master node, and adjust, according to an indication of the second upgrading instruction, a quantity of PEs distributed on the second worker node.

With reference to the third aspect, or either of the first and second possible implementation manners of the third aspect, in a third possible implementation manner, the master node is further configured to determine, according to a dependency relationship between an input stream and an output stream of the PE related to the to-be-adjusted data stream, a target PE that needs to perform data recovery and a checkpoint for the target PE performing data recovery, delivering a data recovery instruction to a worker node at which the target PE is located, where the data recovery instruction is used to instruct the target PE to recover data according to the checkpoint, and trigger the target PE to input the recovered data to a downstream PE of the target PE for processing after the first worker node completes adjustment, and the PEs distributed on the first worker node get ready.

It can be known from the foregoing technical solutions that, according to the streaming application upgrading method and the stream computing system provided in the embodiments of the present disclosure, a logical model of a streaming application is compared with an updated logical model of the streaming application, to dynamically determine a to-be-adjusted data stream, and a corresponding upgrading instruction is generated according to the to-be-adjusted data stream and delivered to a worker node, thereby upgrading the streaming application in the stream computing system online without interrupting a service.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following describes the technical solutions of the present disclosure with reference to the accompanying drawings in the embodiments of the present disclosure. The following described embodiments are some of the embodiments of the present disclosure. Based on the embodiments of the present disclosure, persons of ordinary skill in the art can obtain other embodiments that can resolve the technical problem of the present disclosure and implement the technical effect of the present disclosure by equivalently altering some or all the technical features even without creative efforts. The embodiments obtained by means of alteration do not depart from the scope disclosed in the present disclosure.

Figure 4:
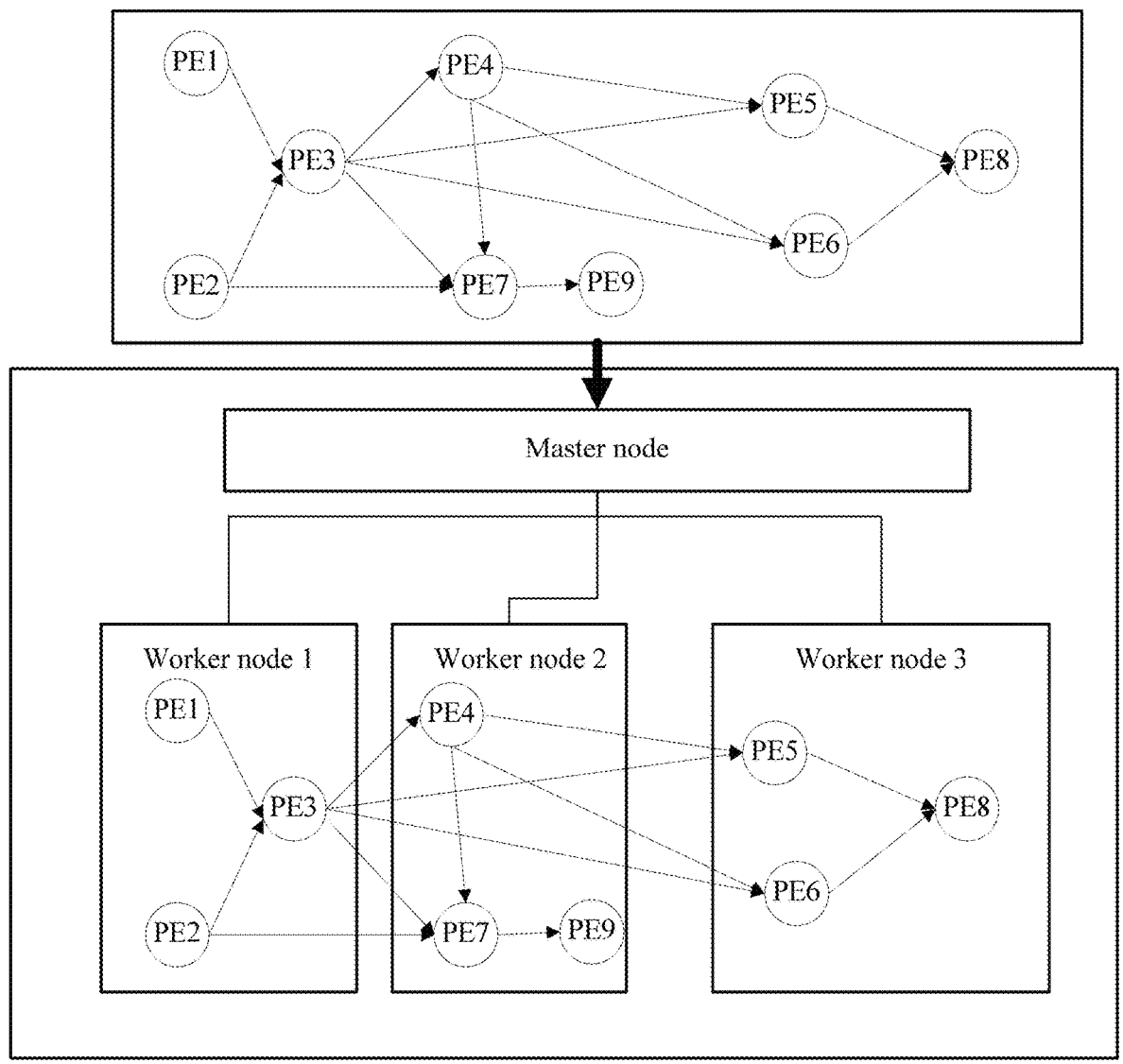
FIG. 4 is a diagram of a working principle of a stream computing system according to an embodiment of the present disclosure.

The technical solutions provided in the embodiments of the present disclosure may be typically applied to a stream computing system. FIG. 4 describes a basic structure of a stream computing system, and the stream computing system includes a master node and multiple worker nodes. During cluster deployment, there may be one or more master nodes and one or more worker nodes, and a master node may be a physical node separated from a worker node, and during standalone deployment, a master node and a worker node may be logical units deployed on a same physical node, where the physical node may be a computer or a server. The master node is responsible for scheduling a data stream to the worker node for processing. Generally, one physical node is one worker node. In some cases, one physical node may correspond to multiple worker nodes, a quantity of worker nodes corresponding to one physical node depends on physical hardware resources of the physical node. One worker node may be understood as one physical hardware resource. Worker nodes corresponding to a same physical node communicate with each other by means of process communication, and worker nodes corresponding to different physical nodes communicate with each other by means of network communication.

As shown in FIG. 4, a stream computing system includes a master node, a worker node 1, a worker node 2, and a worker node 3.

The master node deploys, according to a logical model of a streaming application, the streaming application in the three worker nodes, the worker node 1, the worker node 2, and the worker node 3 for processing. The logical model shown in FIG. 4 is a logical relationship diagram including nine PEs, PE1 to PE9, and directions of data streams between the nine PEs, and the directions of the data streams between the PEs also embodies dependency relationships between input streams and output streams of the PEs. It should be noted that, a data stream in the embodiments of the present disclosure is also briefly referred to as a stream.

The master node configures PE1, PE2, and PE3 on the worker node 1, PE4, PE7, and PE9 on the worker node 2, and PE5, PE6, and PE8 on the worker node 3 according to the logical model of the streaming application to process a data stream of the streaming application. It can be seen that, after the configuration, a direction of a data stream between the PEs on the worker nodes 1, 2, and 3 matches the logical model of the streaming application.

Figure 2:
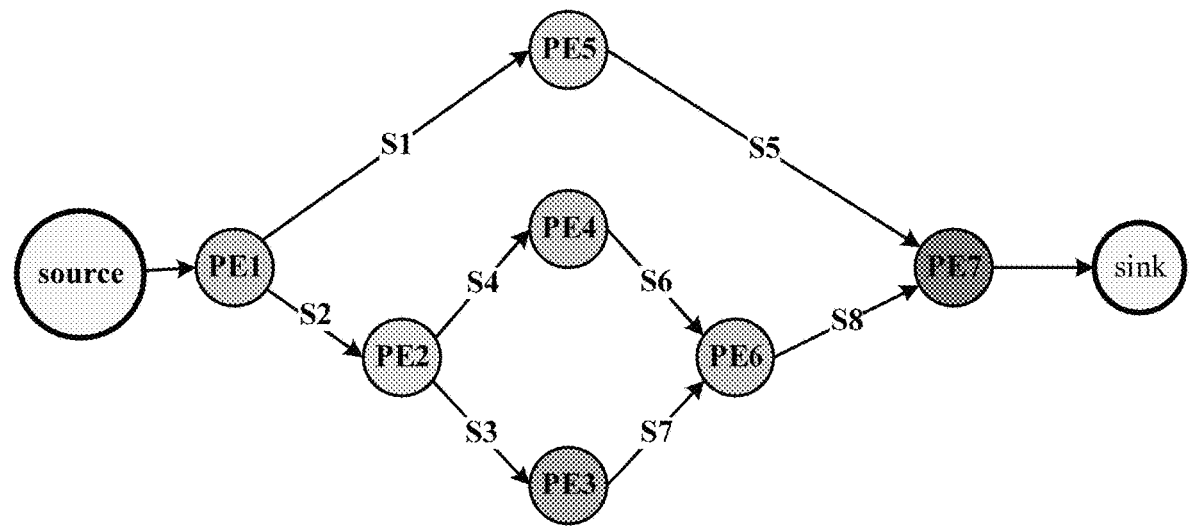
FIG. 2 is a schematic diagram of a logical model of a streaming application according to an embodiment of the present disclosure.
Figure 3:
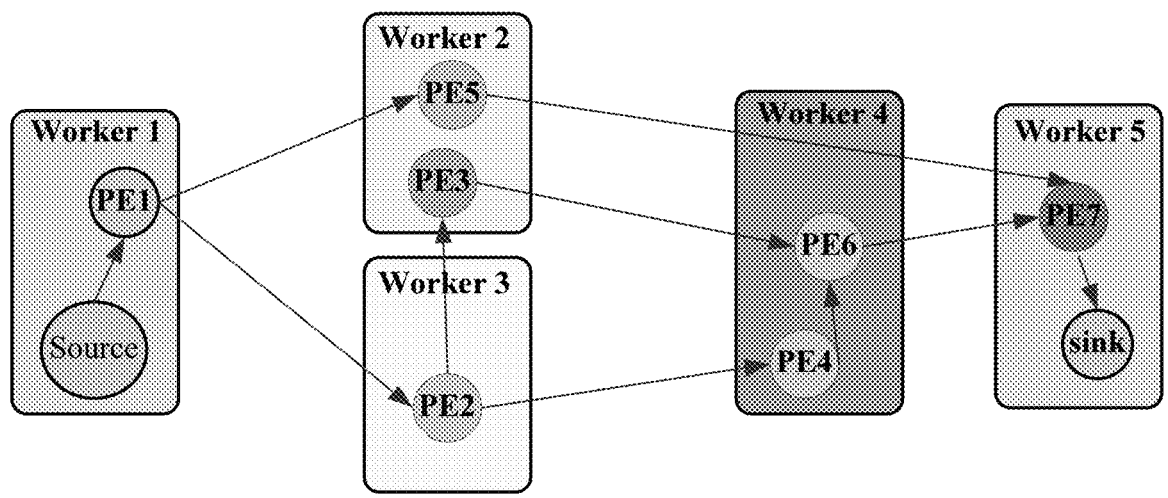
FIG. 3 is a schematic diagram of deployment of a streaming application according to an embodiment of the present disclosure.

The logical model of the streaming application in the embodiments of the present disclosure may be a DAG, a tree graph, or a cyclic graph. The logical model of the streaming application may be understood by referring to FIG. 2. A diagram of a streaming computing application shown in FIG. 2 includes seven operators from PE1 to PE7, and eight data streams from S1 to S8. FIG. 2 explicitly marks directions of the data streams, for example, the data stream S1 is from PE1 to the PE5, which denotes that PE5 processes a stream output by PE1, that is, an output of PE5 depends on an input of PE1. PE5 is generally also referred to as a downstream PE of PE1, and PE1 is an upstream PE of PE5. It can be understood that, an upstream PE and a downstream PE are determined according to a direction of a data stream between the PEs, and only two PEs are related to one data stream, a source PE that outputs the data stream, and a destination PE to which the data stream is directed, that is, a PE receiving the data stream. Viewed from a direction of a data stream, a source PE is an upstream PE of a destination PE, and the destination PE is a downstream PE of the source PE. Further, after a data stream S2 is input to PE2, and subject to logical processing of PE2, two data streams S3 and S4 are generated, and enter PE3 and PE4 respectively for logical processing. Likewise, PE2 is also a downstream PE of PE1, and PE1 is an upstream PE of PE2. The data stream S6 output by PE4 and a data stream S7 output by PE3 are both used as inputs of PE6, that is, an output of PE6 depends on inputs of PE3 and PE4. It should be noted that, in the embodiments of the present disclosure, a PE whose output depends on an input of a single PE is defined as a stateless PE, such as PES, PE3, or PE4, and a PE whose output depends on inputs of multiple PEs is defined as a stateful PE, such as PE6 or PE7. A data stream includes a single data segment referred to as a tuple, where the tuple may be structured or unstructured data. Generally, a tuple may denote a status of an object at a specific time point, a PE in the stream computing system processes a data stream generated by the streaming application using a tuple as unit, and it may be also considered that a tuple is a minimum granularity for division and denotation of data in the stream computing system.

It should be further noted that, the stream computing system is only a typical application scenario of the technical solutions of the present disclosure, and does not constitute any limitation on application scenarios of the present disclosure, and the technical solutions of the embodiments of the present disclosure are all applicable to other application scenarios involved in application deployment and upgrading of a distributed system or a cloud computing system.

Figure 1:
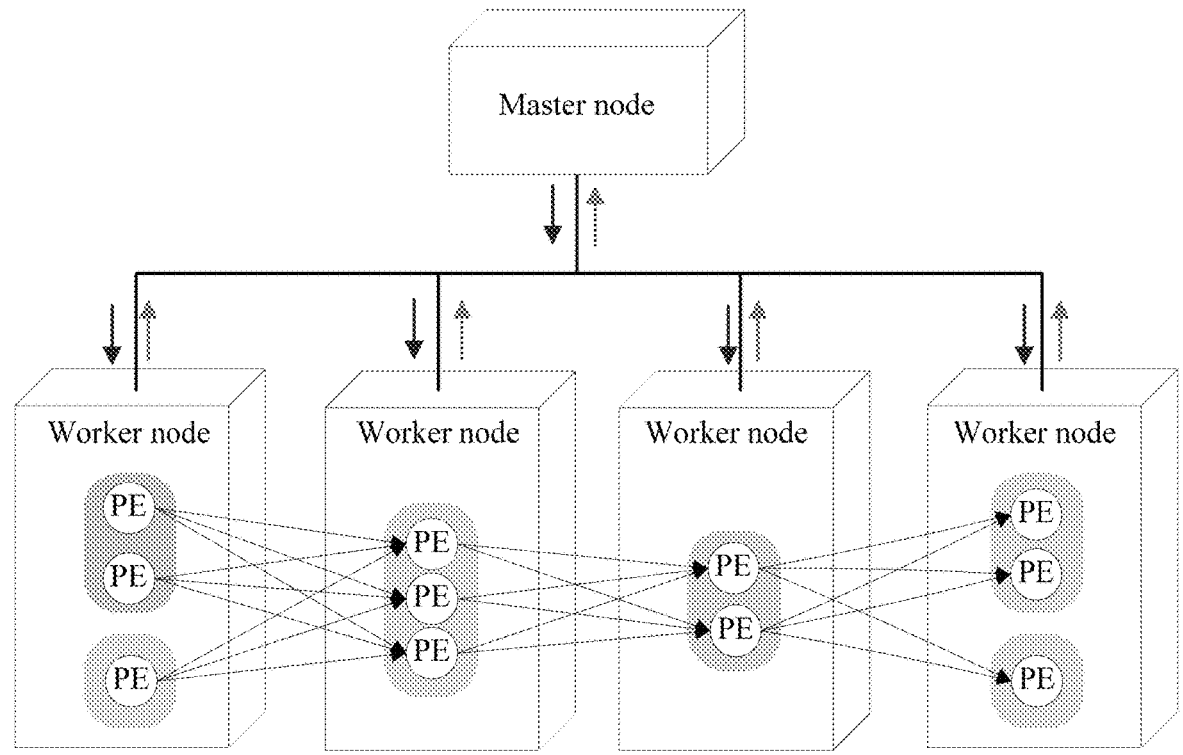
FIG. 1 is a schematic diagram of an architecture of a stream computing system according to the present disclosure.
Figure 5:
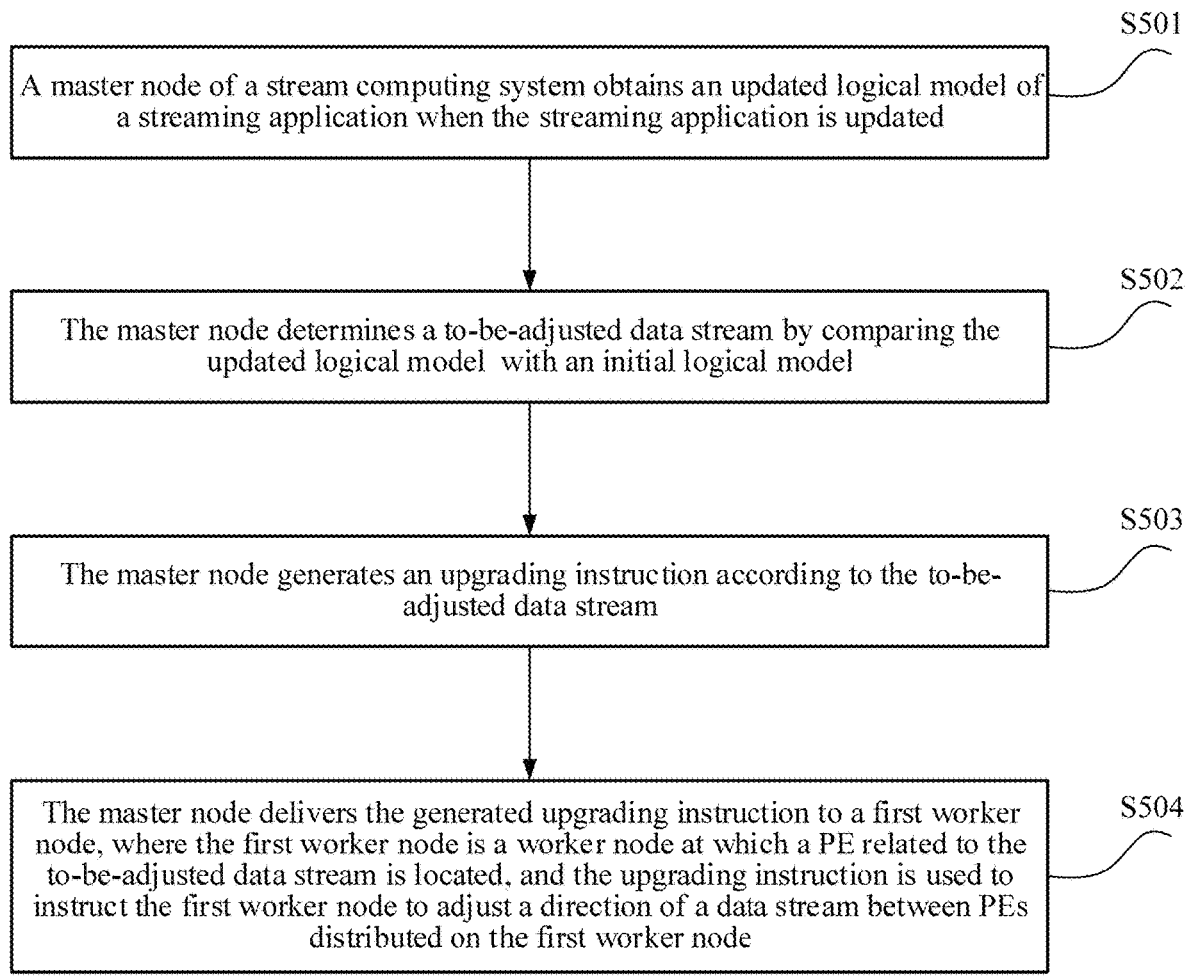
FIG. 5 is a flowchart of a streaming application upgrading method according to an embodiment of the present disclosure.
Figure 6:
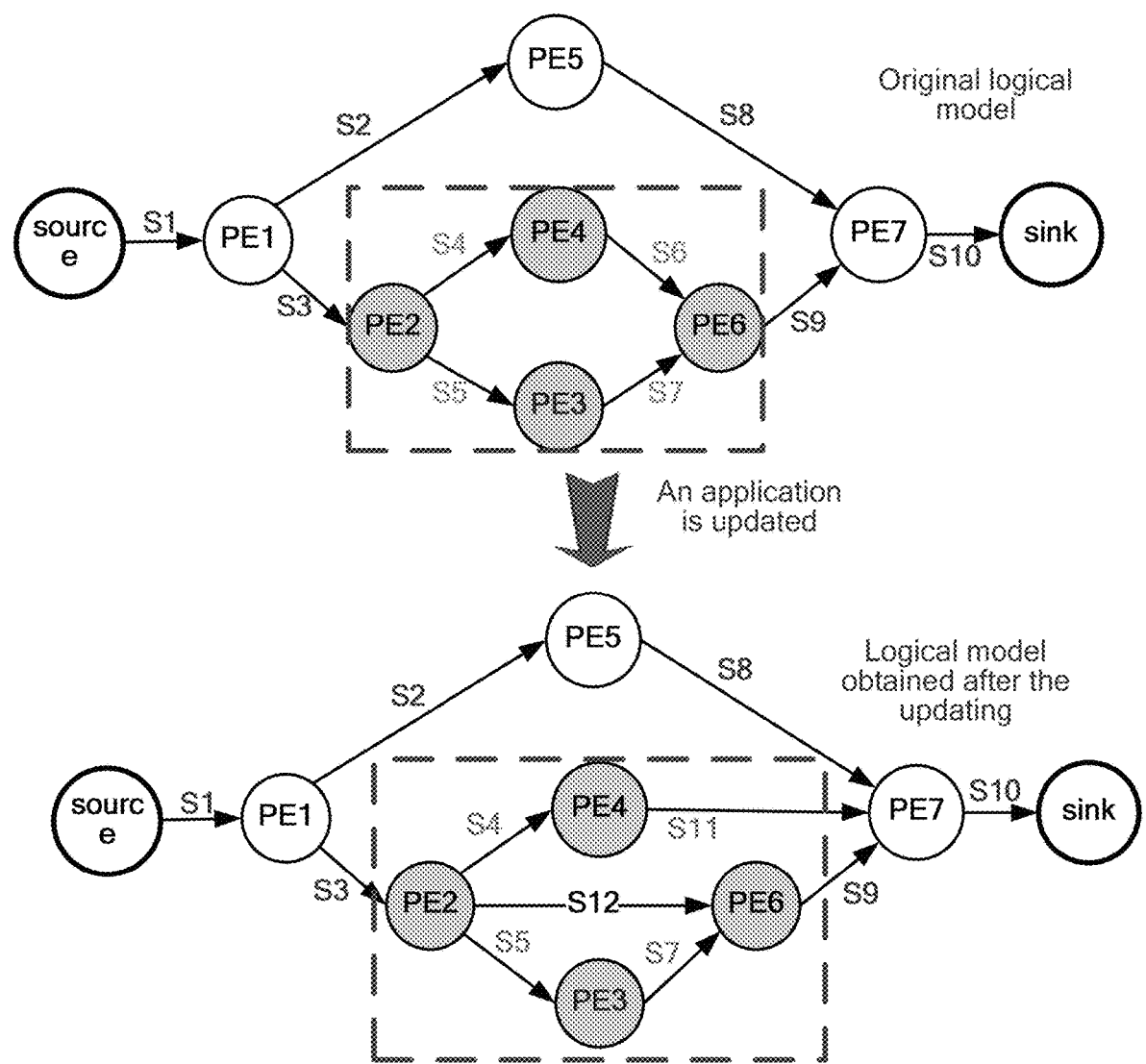
FIG. 6 is a schematic diagram of a change to a logical model of a streaming application after the streaming application is updated according to an embodiment of the present disclosure.

An embodiment of the present disclosure provides a streaming application upgrading method, where the method may be typically applied to the stream computing system shown in FIG. 1 and FIG. 4. Assuming that a streaming application is deployed in the stream computing system, the master node of the stream computing system deploys multiple PEs according to the initial logical model to process a data stream of the streaming application, where the multiple PEs are distributed on one or more worker nodes of the stream computing system. As shown in FIG. 6, after the streaming application is upgraded or updated, the logical model of the streaming application is correspondingly updated, updating of the logical model is generally completed by a developer, or by a developer with a development tool, which is not particularly limited in the present disclosure. As shown in FIG. 5, a main procedure of the streaming application upgrading method is described as follows.

Step S501: A master node of a stream computing system obtains an updated logical model of a streaming application when the streaming application is updated.

Step S502: The master node determines a to-be-adjusted data stream by comparing the updated logical model with the initial logical model.

Step S503: The master node generates an upgrading instruction according to the to-be-adjusted data stream.

Step S504: The master node delivers the generated upgrading instruction to a first worker node, where the first worker node is a worker node at which a PE related to the to-be-adjusted data stream is located, and the upgrading instruction instructs the first worker node to adjust a direction of a data stream between PEs distributed on the first worker node.

It should be noted that, there may be one or more to-be-adjusted data streams in this embodiment of the present disclosure, which depends on a specific situation. PEs related to each to-be-adjusted data stream refer to a source PE and a destination PE of the to-be-adjusted data stream, where the source PE of the to-be-adjusted data stream is a PE that outputs the to-be-adjusted data stream, the destination PE of the to-be-adjusted data stream is a PE receiving the to-be-adjusted data stream or a downstream PE of the source PE of the to-be-adjusted data stream.

According to the streaming application upgrading method and the stream computing system provided in this embodiment of the present disclosure, a logical model of a streaming application is compared with an updated logical model of the streaming application, to dynamically determine a to-be-adjusted data stream, and a corresponding upgrading instruction is generated according to the to-be-adjusted data stream and delivered to a worker node, thereby upgrading the streaming application in the stream computing system online without interrupting a service.

In this embodiment of the present disclosure, the logical model of the streaming application denotes multiple PEs processing data of the streaming application and a direction of a data stream between the multiple PEs. The logical model of the streaming application is correspondingly updated after the streaming application is upgraded or updated. Generally, a difference between an updated logical model and the initial logical model is mainly divided into two types:

(1) The PEs denoted by the initial logical model are completely the same as PEs denoted by the updated logical model, and only a direction of a data stream between PEs changes; and (2) The PEs denoted by the initial logical model are not completely the same as the PEs denoted by the updated logical model, and a direction of a data stream between PEs also changes. For the foregoing two types of differences, corresponding processing procedures are described below.

In a specific embodiment, as shown in FIG. 6, PEs denoted by an initial logical model of a streaming application are completely the same as PEs denoted by an updated logical model of the streaming application, and a direction of a data stream between PEs changes. According to FIG. 6, both the PEs in the logical model of the streaming application before updating and the PEs in the logical model of the streaming application that is updated are PE1 to PE7, and are completely the same, but a direction of a data stream changes, that is, a data stream from PE4 to PE6 becomes a data stream S1*l* from PE4 to PE7, and a data stream S12 from PE2 to PE6 is added. In this case, a main procedure of the streaming application upgrading method is as follows.

Step 1: Determine a to-be-adjusted data stream by comparing an initial logical model of a streaming application with an updated logical model of the streaming application, where the to-be-adjusted data stream includes one or more data streams. Further, in an embodiment, the to-be-adjusted data stream may include at least one of a to-be-added data stream, a to-be-deleted data stream, and a to-be-updated data stream, where the to-be-updated data stream refers to a data stream whose destination node or source node changes after the logical model of the streaming application is updated. Further, as shown in FIG. 6, the to-be-adjusted data stream includes a to-be-added data stream S12, and a to-be-updated data stream S11.

Step 2: Generate an upgrading instruction according to the to-be-adjusted data stream, where the upgrading instruction may include one or more instructions, and the upgrading instruction is related to a type of the to-be-adjusted data stream. For example, the generated upgrading instruction includes an instruction used to add a data stream and an instruction used to update a data stream if the to-be-adjusted data stream includes a to-be-added data stream and a to-be-updated data stream, where different types of upgrading instructions may be separate instructions, or may be integrated into one instruction, which is not particularly limited in the present disclosure either. Further, as shown in FIG. 6, the generated upgrading instruction includes an instruction for adding the data stream S12 and an instruction for updating a data stream S6 to a data stream S11.

Step 3: Deliver the generated upgrading instruction to a first worker node, where the first worker node is a worker node at which a PE related to the to-be-adjusted data stream is located. It can be understood that, there may be one or more first worker nodes. After receiving the upgrading instruction, a first worker node performs operations indicated by the upgrading instruction, for example, adding the data stream S12, and updating the data stream S6 to the data stream S11 such that a direction of a data stream between PEs distributed on the first worker node is adjusted, and a direction of a data stream after the adjustment matches the updated logical model.

Further, when the first worker node adjusts a data stream between PEs distributed on the first worker node, data being processed may be lost, and therefore the data needs to be recovered. Further, in an embodiment, before the first worker node adjusts a data stream between PEs distributed on the first worker node, a master node determines, according to a dependency relationship between an input stream and an output stream of a PE related to the to-be-adjusted data stream, a target PE that needs to perform data recovery and a checkpoint for the target PE performing data recovery, and delivers a data recovery instruction to a worker node at which the target PE is located, where the data recovery instruction is used to instruct the target PE to recover data according to the checkpoint, and after the master node determines that the first worker node completes adjustment, and the PEs distributed on the first worker node get ready, the master node triggers the target PE to input the recovered data to a downstream PE of the target PE for processing.

It should be noted that, the master node may perceive a status of a PE on each worker node in the stream computing system by actively sending a query message, or a worker node may report a status of each PE distributed on the worker node to the master node, where a status of a PE includes a running state, a ready state and a stopped state. When a channel between a PE and an upstream or downstream PE is established successfully, the PE is in the ready state, and the PE may receive and process a data stream.

Optionally, before performing the steps of the foregoing streaming application upgrading method, the master node may further configure multiple PEs according to the initial logical model of the streaming application such that the multiple PEs process data of the streaming application.

According to the streaming application upgrading method provided in this embodiment of the present disclosure, a logical model of a streaming application is compared with an updated logical model of the streaming application, to dynamically determine a to-be-adjusted data stream, and a corresponding upgrading instruction is generated and delivered to a worker node, to complete online upgrading of the streaming application, thereby ensuring that a service does not need to be interrupted in an application upgrading process, and further, data is recovered in the upgrading process, to ensure that key data is not lost, and service running is not affected.

Figure 7:
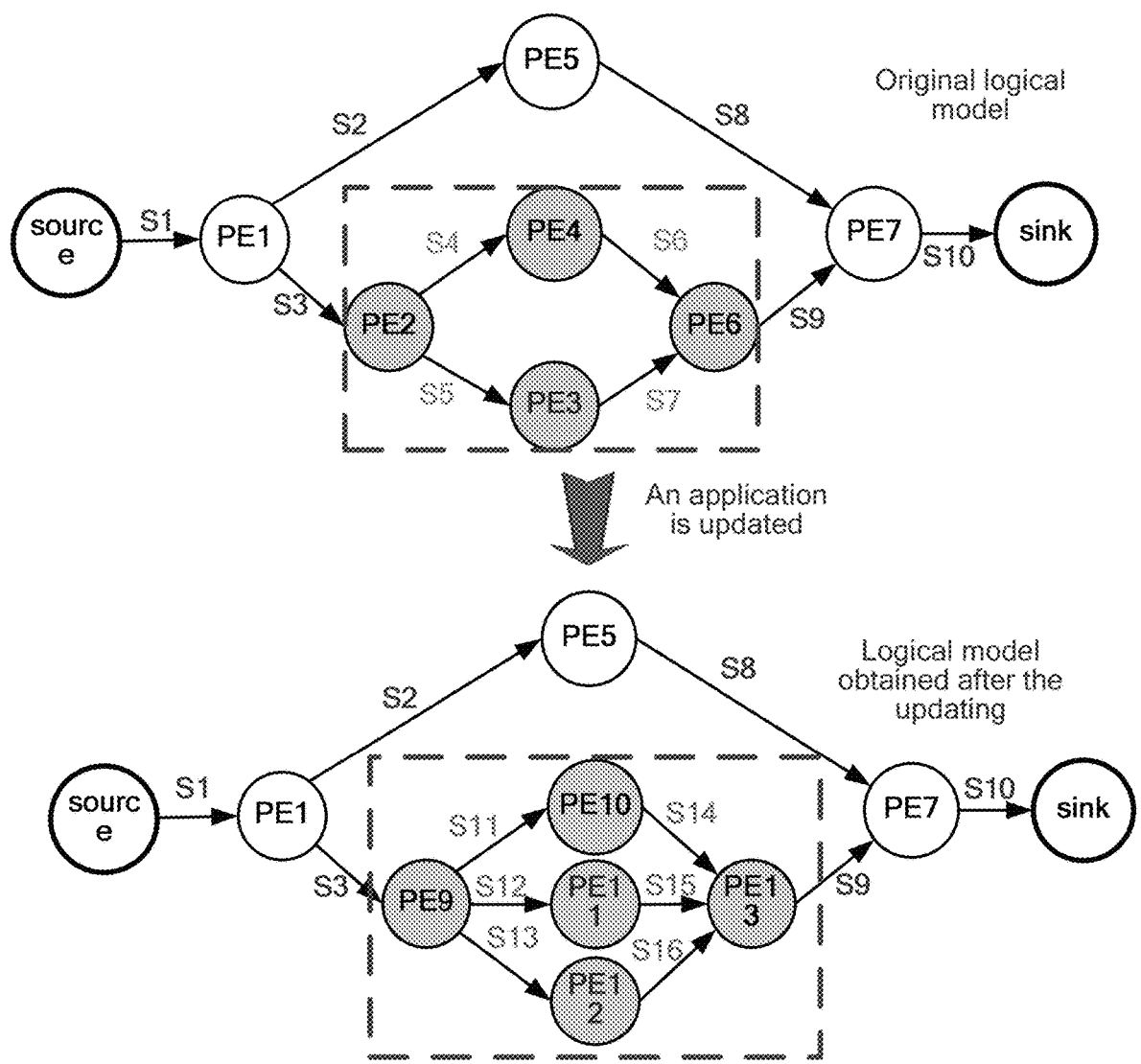
FIG. 7 is a schematic diagram of a change to a logical model of a streaming application after the streaming application is updated according to an embodiment of the present disclosure.

In another specific embodiment, as shown in FIG. 7, PEs denoted by an initial logical model of a streaming application are not completely the same as PEs denoted by an updated logical model of the streaming application, and a direction of a data stream between the PEs also changes.

Figure 8:
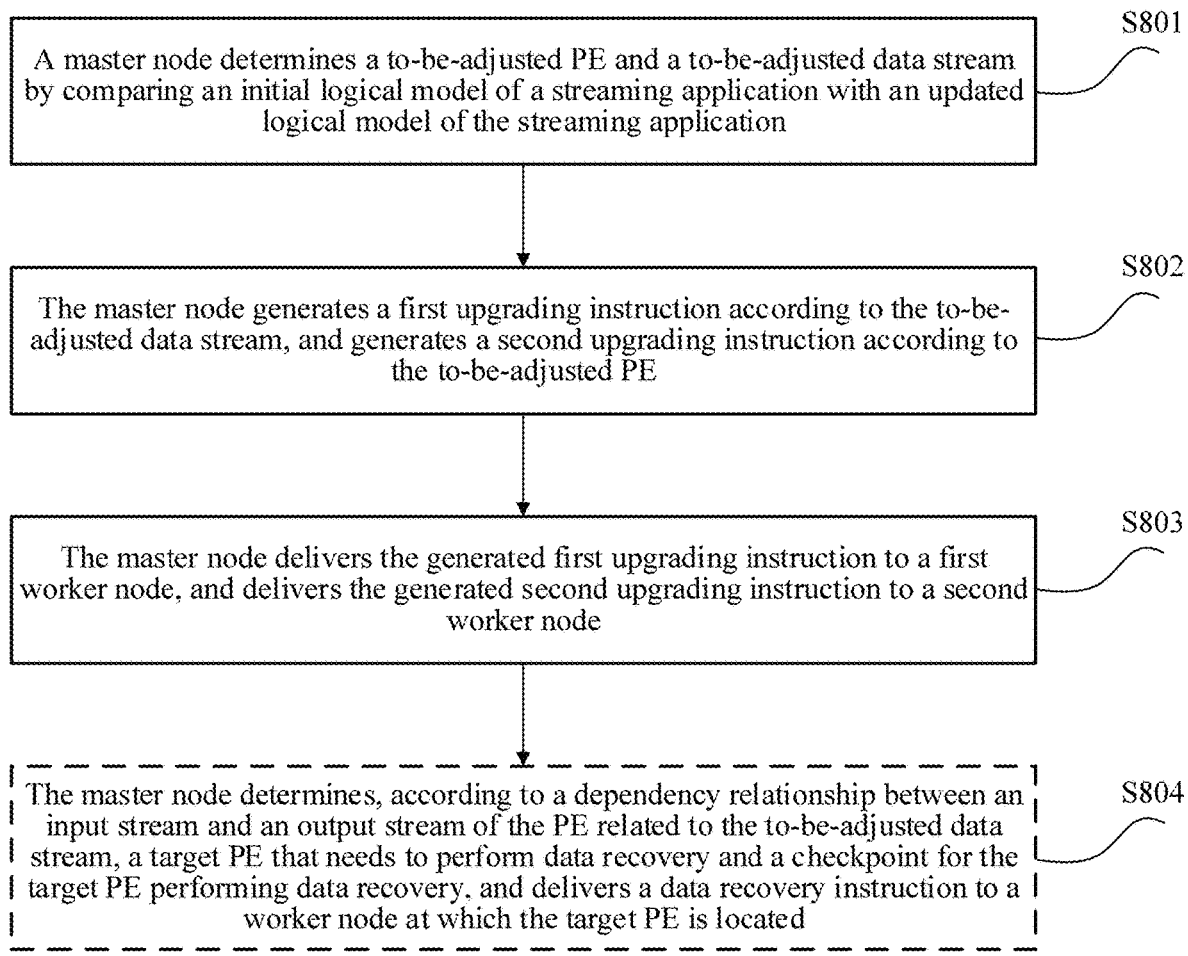
FIG. 8 is a flowchart of a streaming application upgrading method according to an embodiment of the present disclosure.

According to FIG. 7, a quantity of the PEs in the logical model of the streaming application before updating is different from a quantity of the PEs in the logical model of the streaming application that is updated (PE2, PE3, PE4 and PE6 are deleted, and PE9, PE10, PE11, PE12 and PE13 are added), a direction of a data stream also changes, that is, original data streams S4, S5, S6, and S7 are deleted, and data streams S11, S12, S13, S14, S15 and S16 are added, a destination PE of an original data stream S3 is updated, and a source PE of an original data stream S9 is updated. In this case, as shown in FIG. 8, a main procedure of the streaming application upgrading method is as follows.

Step S801: A master node determines a to-be-adjusted PE and a to-be-adjusted data stream by comparing an initial logical model of a streaming application with an updated logical model of the streaming application, where the to-be-adjusted PE includes one or more PEs, and the to-be-adjusted data stream includes one or more data streams. Further, in an embodiment, the to-be-adjusted PE includes at least one of a to-be-added PE and a to-be-deleted PE, and the to-be-adjusted data stream may include at least one of a to-be-added data stream, a to-be-deleted data stream, and a to-be-updated data stream.

Figure 9:
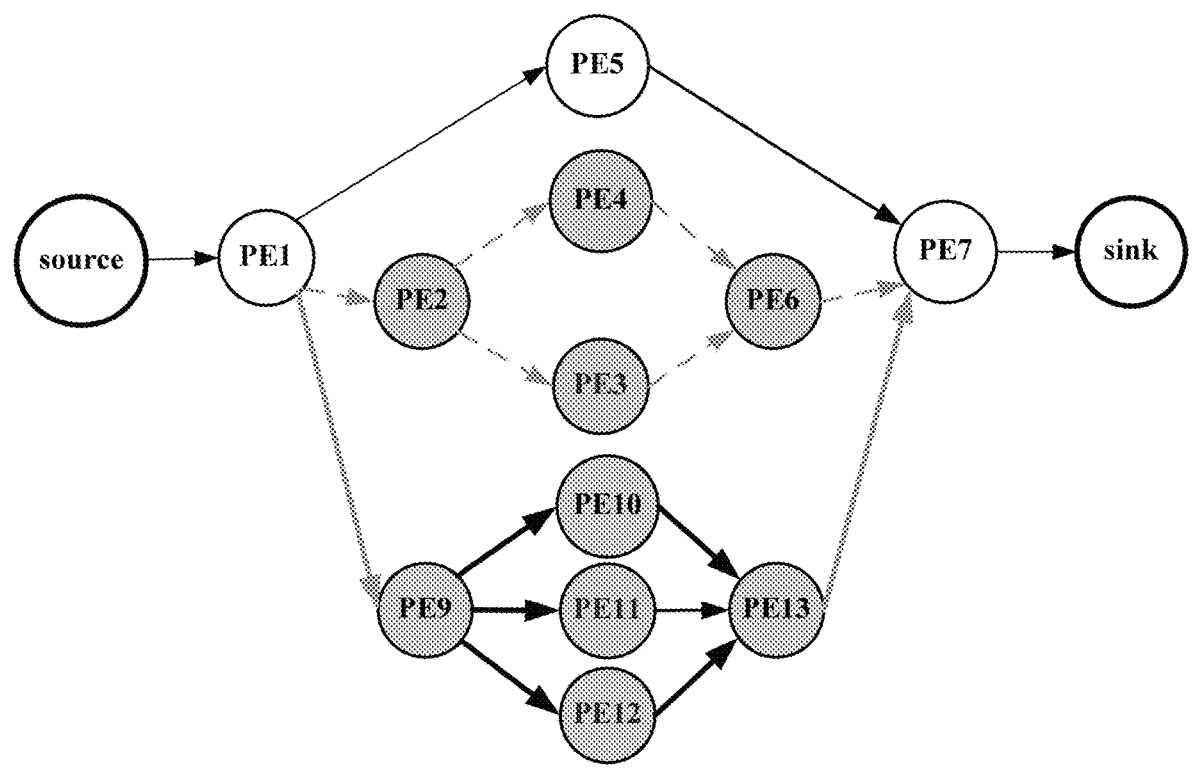
FIG. 9 is a schematic diagram of a logical model of a streaming application according to an embodiment of the present disclosure.

Further, as shown in FIG. 9, the master node may determine, by comparing the logical model of the streaming application before updating with the logical model of the streaming application that is updated, that the initial logical model is the same as the updated logical model only after a logical submodel including PE2, PE3, PE4, and PE6 in the initial logical model is replaced with a logical submodel including PE9, PE10, PE11, PE12 and PE13. Therefore, it is determined that PE2, PE3, PE4, PE6, and PE9, PE10, PE11, PE12 and PE13 are to-be-adjusted PEs (where PE2, PE3, PE4 and PE6 are to-be-deleted PEs, and PE9, PE10, PE11, PE12 and PE13 are to-be-added PEs), and it is determined that data streams related to the to-be-adjusted PEs, that is, all input streams and output streams of the to-be-adjusted PEs are to-be-adjusted streams. As shown in FIG. 9, a stream indicated by a dashed line part is a to-be-deleted data stream, and a stream indicated by a black bold part is a to-be-added data stream, and a stream indicated by a light-colored bold part is a to-be-updated data stream.

Step S802: The master node generates a first upgrading instruction according to the to-be-adjusted data stream, and generates a second upgrading instruction according to the to-be-adjusted PE, where the first upgrading instruction and the second upgrading instruction may include one or more instructions each, the first upgrading instruction is related to a type of the to-be-adjusted data stream, and the second upgrading instruction is related to a type of the to-be-adjusted PE. For example, the generated first upgrading instruction includes an instruction used to add a data stream and an instruction used to update a data stream if the to-be-adjusted data stream includes a to-be-added data stream and a to-be-updated data stream, and the generated second upgrading instruction includes an instruction used to add a PE if the to-be-adjusted PE includes a to-be-added PE, where the first upgrading instruction and the second upgrading instruction may be separate instructions, or may be integrated into one instruction, which is not particularly limited in the present disclosure either. Further, as shown in FIG. 7, the generated first upgrading instruction includes an instruction for deleting a data stream, an instruction for adding a data stream, and an instruction for updating a data stream. Further, the second upgrading instruction includes an instruction for adding a PE, and an instruction for deleting a PE.

In a specific embodiment, as shown in FIG. 9, after determining the to-be-adjusted PE and the to-be-adjusted stream by comparing the logical model of the streaming application before updating with the logical model of the streaming application that is updated, the master node may further determine an adjustment policy, that is, how to adjust a PE and a stream such that PE deployment after the adjustment (including a quantity of PEs and a dependency relationship between data streams between the PEs) matches the updated logical model of the streaming application. The adjustment policy includes two pieces of content:

(1) A policy of adjusting a quantity of PEs, that is, which PEs need to be added and/or which PEs need to deleted; and (2) A policy of adjusting a direction of a data stream between PEs, that is, directions of which data streams between PEs need to be updated, which data streams need to be added, and which data streams need to be deleted.

In an embodiment, the adjustment policy mainly includes at least one of the following:

(1) Update a stream: either a destination node or a source node of a data stream changes;

(2) Delete a stream: a data stream needs to be discarded after an application is updated;

(3) Add a stream: no data stream originally exists, and a stream is added after an application is updated;

(4) Delete a PE: a PE needs to be discarded after an application is updated; and (5) Add a PE: a PE is added after an application is updated.

Figure 10:
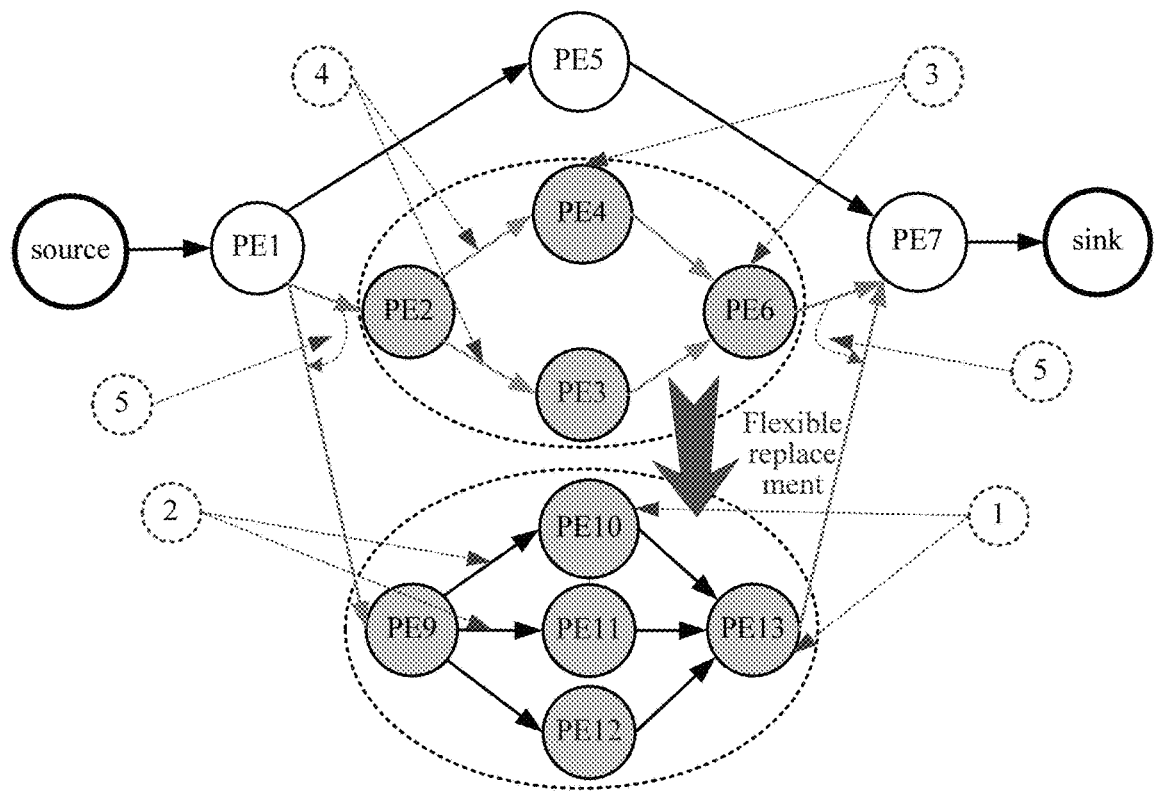
FIG. 10 is a schematic diagram of an adjustment of a logical model of a streaming application according to an embodiment of the present disclosure.

Further, in the logical models shown in FIG. 7 and FIG. 9, it can be seen with reference to FIG. 10 that, five PEs (PE9 to PE13) need to be added, data streams between PE9 to PE13 need to be added, PE2, PE3, PE4, and PE6 need to be deleted, and data streams between PE2, PE3, PE4, and PE6 need to be deleted. In addition, because a destination PE of an output stream of PE1 changes (from PE2 to PE9), and an input stream of PE7 also changes (from an output stream of PE6 to an output stream of PE13, that is, a source node of a stream changes), an output stream of PE1 and an input stream of PE7 need to be updated. Based on the foregoing analysis, it may be learned that the adjustment policy is as follows.

(1) Add PE9 to PE13;

(2) Add streams between PE9 to PE13, where directions of data streams between PE9 to PE13 are determined by the updated logical model;

(3) Delete PE2, PE3, PE4, and PE6;

(4) Delete streams between PE2, PE3, PE4, and PE6; and (5) Change a destination PE of an output stream of PE1 from PE2 to PE9; and change a source PE of an input stream of PE7 from PE6 to PE13.

After the adjustment policy is determined, the master node may generate an upgrading instruction based on the determined adjustment policy, where the upgrading instruction is used to instruct a worker node (which is a worker node at which a to-be-adjusted PE is located and a worker node at which a PE related to a to-be-adjusted data stream is located) to implement the determined adjustment policy. Corresponding to the adjustment policy, the upgrading instruction includes at least one of an instruction for adding a PE, an instruction for deleting a PE, an instruction for updating a stream, an instruction for deleting a stream, and an instruction for adding a stream. Further, in the logical models shown in FIG. 7 and FIG. 9, the upgrading instruction includes the following.

(1) an instruction for adding PE9 to PE13;

(2) an instruction for adding streams between PE9 to PE13;

(3) an instruction for deleting PE2, PE3, PE4, and PE6;

(4) an instruction for deleting streams between PE2, PE3, PE4, and PE6;

(5) an instruction for changing a destination PE of an output stream of PE1 from PE2 to PE9; and (6) an instruction for changing a source PE of an input stream of PE7 from PE6 to PE13.

Step S803 The master node delivers the generated first upgrading instruction to a first worker node, and delivers the generated second upgrading instruction to a second worker node, where the first worker node is a worker node at which a PE related to the to-be-adjusted data stream is located, and the second worker node includes a worker node at which the to-be-adjusted PE is located. It can be understood that, there may be one or more first worker nodes and one or more second worker nodes, and the first worker node and the second worker node may be overlapped, that is, a worker node may not only belong to the first worker node but also belong to the second worker node. The first upgrading instruction instructs the first worker node to adjust the direction of the data stream between the PEs distributed on the first worker node, and the second upgrading instruction instructs the second worker node to adjust a quantity of PEs distributed on the second worker node. After receiving the upgrading instruction, the first worker node and the second worker node perform an operation indicated by the upgrading instruction such that PEs distributed on the first worker node and the second worker node and a direction of a data stream between the PEs are adjusted. It can be understood that, adjusting, by the second worker node, a quantity of PEs distributed on the second worker node may be creating a PE and/or deleting a created PE.

Optionally, in a specific embodiment, if the to-be-adjusted PE includes a to-be-deleted PE, the second worker node includes a worker node at which the to-be-deleted PE is located, and the second upgrading instruction instructs the second worker node to delete the to-be-deleted PE.

Optionally, in another specific embodiment, if the to-be-adjusted PE includes a to-be-added PE, the second worker node may be a worker node selected by the master node according to a load status of each worker node in the stream computing system, or may be a worker node randomly selected by the master node, and the second upgrading instruction is used to instruct the second worker node to create the to-be-added PE.

Figure 11:
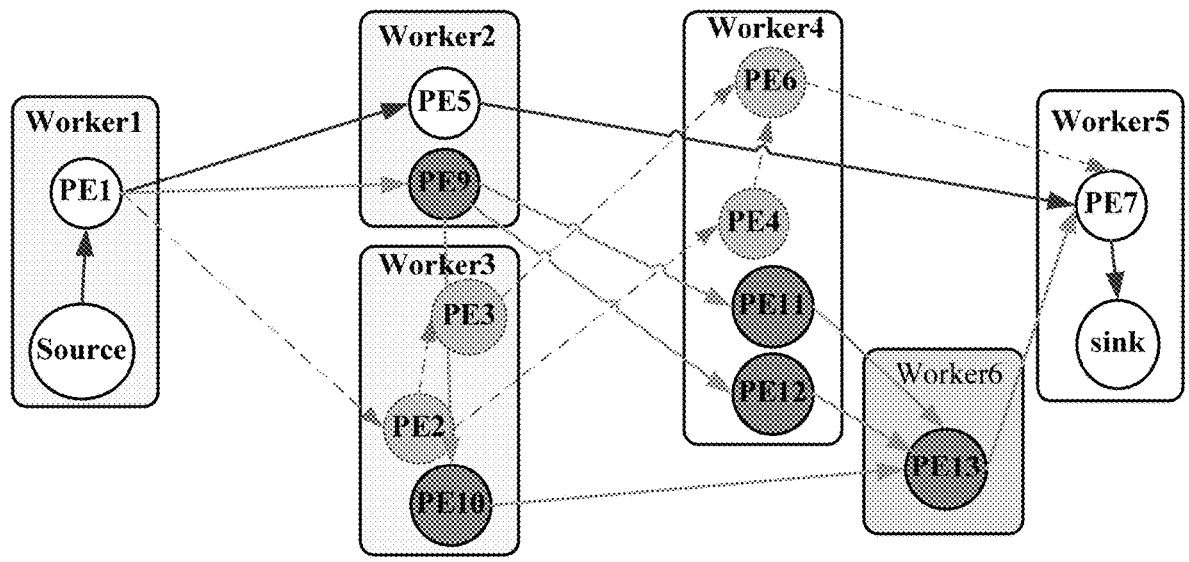
FIG. 11 is a schematic diagram of PE deployment after a streaming application is upgraded according to an embodiment of the present disclosure.

Further, in the logical models shown in FIG. 7 and FIG. 9, as shown in FIG. 11, the master node (not shown) sends, to worker2, an instruction for adding PE9, sends, to worker3, an instruction for adding PE10, sends, to worker4, an instruction for adding PE11 and PE11, and sends, to worker6, an instruction for adding PE13, sends, to worker3, an instruction for deleting PE2 and PE3, and sends, to worker4, an instruction for deleting PE4 and PE6, and sends, to worker3, a worker node at which PE2 and PE3 are initially located, an instruction for deleting a stream between PE2 and PE3, and sends, to worker3, a worker node at which PE3 is located and worker4, a worker node at which PE6 is located, an instruction for deleting a data stream between PE3 and PE6. The other instructions can be deduced by analogy, and details are not described herein again. It should be noted that, each worker node maintains data stream configuration information of all PEs on the worker node, and data stream configuration information of each PE includes information such as a source address, a destination address, and a port number, and therefore deletion and updating of a data stream is essentially implemented by modifying data stream configuration information.

As shown in FIG. 11, according to the upgrading instruction delivered by the master node, PE9 is added to worker2, PE2 and PE3 are deleted from worker3, PE10 is added to worker3, PE6 and PE4 are deleted from worker4, PE11 and PE12 are added to worker4, and PE13 is added to worker6. In addition, worker1 to worker6 also adjust directions of data streams between PEs by performing operations such as an operation for deleting a stream, an operation for adding a stream, and an operation for updating a stream. Further, streams between PE9 to PE13 are added, streams between PE2, PE3, PE4, and PE6 are deleted, and a destination PE of an output stream of PE1 is changed from PE2 to PE9, and a source PE of an input stream of PE7 is changed from PE6 to PE13. It can be seen from FIG. 11 that, PE deployment after the adjustment (including a quantity of PEs and a dependency relationship between data streams between the PEs) matches the updated logical model of the streaming application.

Further, when the first worker node and the second worker node adjust PEs distributed on the first worker node and the second worker node and a data stream between the PEs, data being processed may be lost, and therefore the data needs to be recovered. Further, in an embodiment, the streaming application upgrading method further includes Step S804: The master node determines, according to a dependency relationship between an input stream and an output stream of the PE related to the to-be-adjusted data stream, a target PE that needs to perform data recovery and a checkpoint for the target PE performing data recovery, and delivers a data recovery instruction to a worker node at which the target PE is located, where the data recovery instruction instructs the target PE to recover data according to the checkpoint, and after the master node determines that the first worker node and the second worker node complete adjustment, and the PEs distributed on the first worker node and the second worker node get ready, the master node triggers the target PE to input the recovered data to a downstream PE of the target PE for processing. It should be noted that, the master node may perceive a status of a PE on each worker node in the stream computing system by actively sending a query message, or a worker node may report a status of each PE distributed on the worker node to the master node, where a status of a PE includes a running state, a ready state and a stopped state. When a channel between a PE and an upstream or downstream PE is established successfully, the PE is in the ready state, and the PE may receive and process a data stream.

In a process of updating or upgrading the streaming application, adjustment of PE deployment needs to be involved in adjustment of a data stream, and when the PE deployment is adjusted, some data may be being processed, and therefore, to ensure that data is not lost in the upgrading process, it is needed to determine, according to a dependency relationship between an original input stream and an original output stream of the PE related to the to-be-adjusted data stream, a target PE that needs to perform data recovery and a checkpoint for the target PE performing data recovery, to ensure that data that has not been completely processed by a PE before the application is upgraded can continue to be processed after the upgrading is completed, where the data that needs to be recovered herein generally refers to a tuple.

Figure 12:
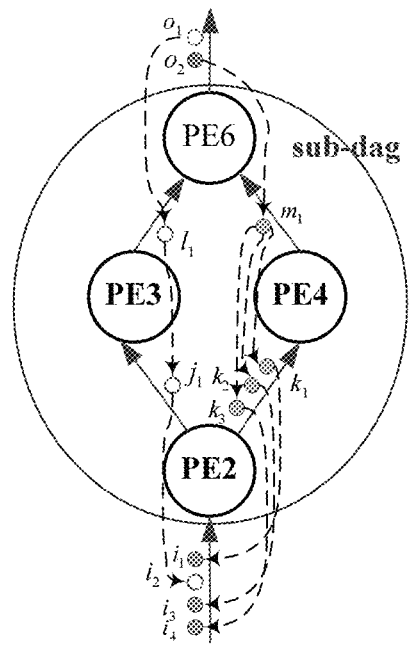
FIG. 12 is a schematic diagram of a dependency relationship between an input stream and an output stream of a PE according to an embodiment of the present disclosure.
Figure 13:
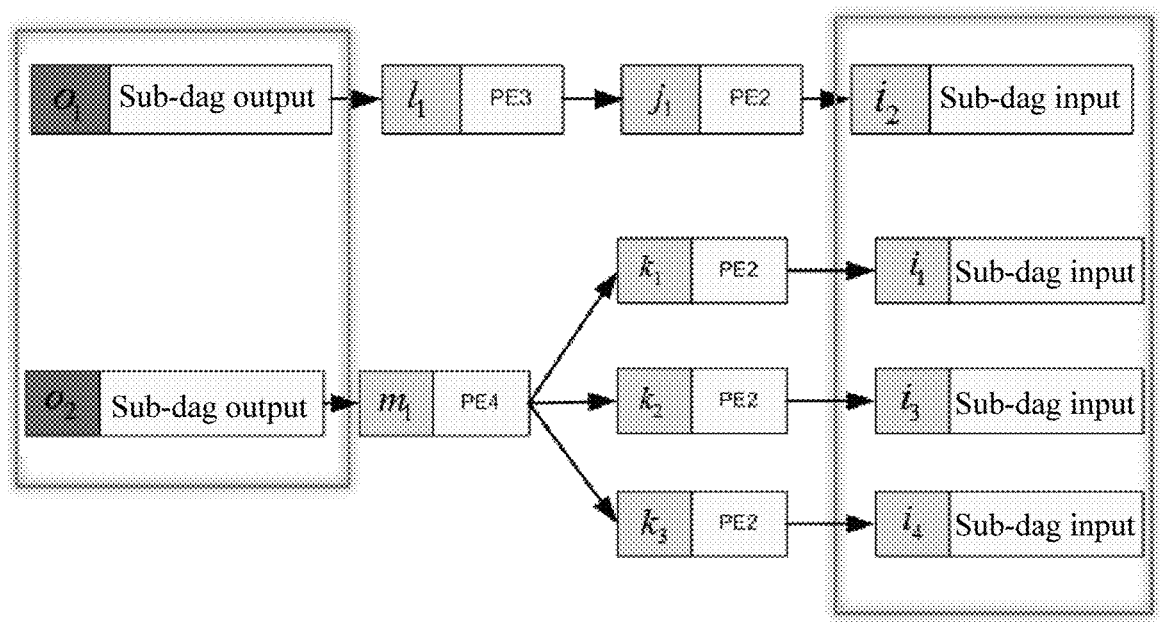
FIG. 13 is a schematic diagram of a dependency relationship between an input stream and an output stream of a PE according to an embodiment of the present disclosure.

In a specific embodiment, as shown in FIG. 12, an input/output relationship of a logical submodel including {PE1, PE2, PE3, PE4, PE6, PE7} related to a to-be-adjusted data stream is as follows. After tuples $i_1$, $i_2$, $i_3$ and $i_4$ are input from PE1 to PE2, the tuples $i_1$, $i_2$, $i_3$ and $i_4$ are processed by PE2 to obtain tuples $k_1$, $k_2$, $k_3$ and $j_1$, and then the tuples $k_1$, $k_2$, and $k_3$ are input to PE4 and processed to obtain $m_1$, the tuple $j_1$ is input to PE3 and processed to obtain $l_1$, and PE6 processes $m_1$ to obtain $O_2$, and processes $l_1$ to obtain $O_1$. Based on the foregoing input/output relationship, a dependency relationship between an input stream and an output stream of a to-be-adjusted PE may be obtained by means of analysis, as shown in FIG. 13, $O_1$ depends on an input $l_1$ of PE6, $l_1$ depends on $j_1$, and $j_1$ depends on $i_2$. Therefore, for an entire logical submodel, the output $O_1$ of PE6 depends on the input $i_2$ of PE2, and $O_2$ depends on the input $m_1$ of PE6, $m_1$ depends on inputs $k_1$, $k_2$ and $k_3$ of PE4, and $k_1$, $k_2$ and $k_3$ also depend on $i_1$, $i_3$ and $i_4$. Therefore, for the entire logical submodel, the output $O_2$ of PE6 depends on the inputs $i_1$, $i_3$ and $i_4$ of PE2. It can be known using the foregoing dependency relationship obtained by means of analysis that, PE2, PE3, PE4, and PE6 all depend on an output of PE1, and therefore, when the first worker node and the second worker node adjust PEs distributed on the first worker node and the second worker node and a data stream between the PEs, data in PE2, PE3, PE4, and PE6 is not completely processed, and then PE1 needs to recover the data, that is, PE1 is a target PE.

Further, it may be determined, according to latest status data backed up by a PE related to a to-be-adjusted data stream when the first worker node and the second worker node adjust the PEs distributed on the first worker node and the second worker node and the data stream between the PEs, whether data input to the PE related to the to-be-adjusted data stream has been completely processed and is output to a downstream PE, and therefore a checkpoint for the target PE performing data recovery may be determined. It should be noted that, status data of a PE denotes a status in which a PE processes data, and content further included in the status data is well-known by persons skilled in the art. For example, the status data may include one or more types of cache data in a tuple receiving queue, cache data on a message channel, and data generated by a PE in a process of processing one or more common tuples in a receiving queue of the PE, such as a processing result of a common tuple currently processed and intermediate process data. It should be noted that, data recovery does not need to be performed on an added data stream, and therefore when a checkpoint for performing data recovery and a target PE that needs to perform data recovery are determined, neither status information of a PE related to a to-be-added data stream, nor a dependency relationship between an input stream and an output stream of the PE related to the to-be-added data stream needs to be used. For example, in an embodiment, if the to-be-adjusted data stream includes a to-be-updated data stream, a to-be-deleted data stream, and a to-be-added data stream, a checkpoint for performing data recovery may be determined according to only status data of a PE related to the to-be-updated data stream and the to-be-deleted data stream, and a target PE that needs to perform data recovery may be determined according to only a dependency relationship between an input stream and an output stream of the PE related to the to-be-updated data stream and the to-be-deleted data stream. Similarly, if the to-be-adjusted data stream includes a to-be-updated data stream and a to-be-added data stream, a checkpoint for performing data recovery and a target PE that needs to perform data recovery may be determined according to only status data of a PE related to the to-be-updated data stream, and a dependency relationship between an input stream and an output stream of the PE related to the to-be-updated data stream.

Figure 14:
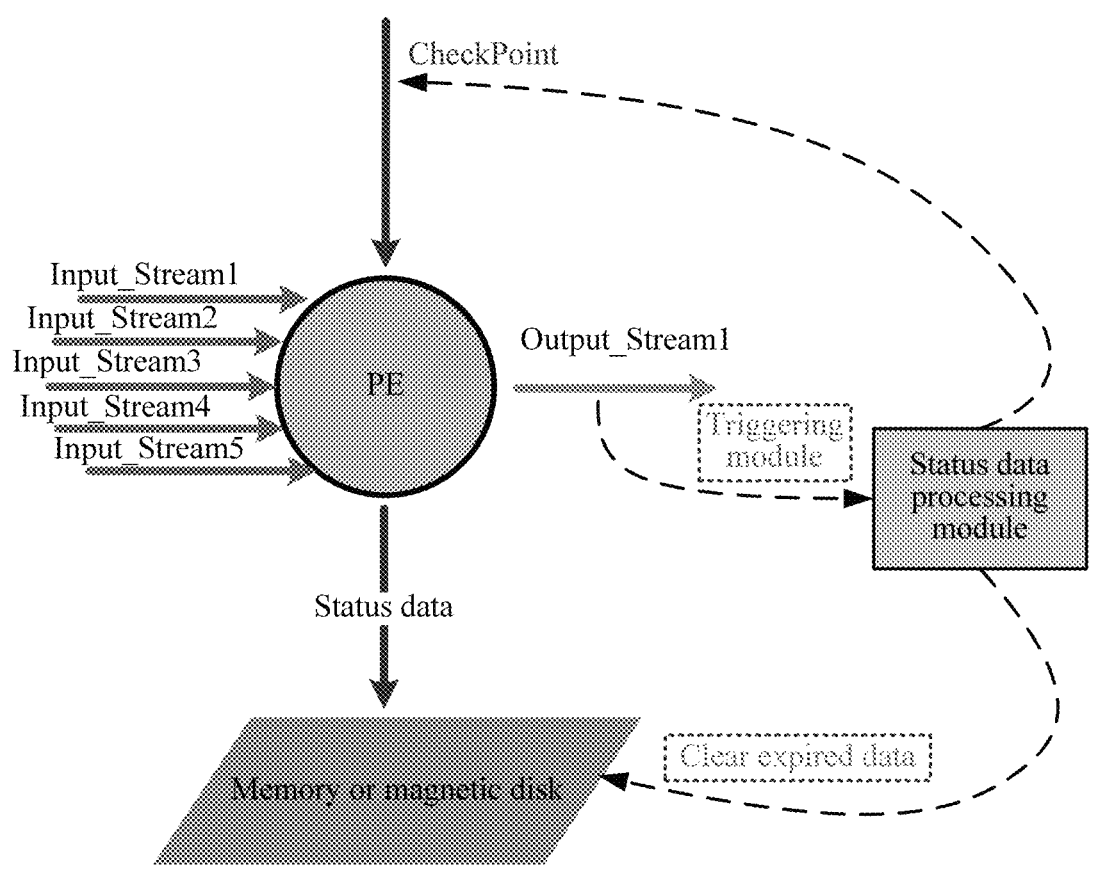
FIG. 14 is a schematic diagram of backup of status data of a PE according to an embodiment of the present disclosure.

It should be noted that, in an embodiment of the present disclosure, status data of a PE is periodically backed up, that is, the stream computing system periodically triggers each PE to back up status data of the PE, and after receiving a checkpoint event, the PE backups current status data of the PE, records the checkpoint, and clears expired data. It can be understood by persons skilled in the art that, a checkpoint may be understood as a record point of data backup or an index of backup data, one checkpoint corresponds to one data backup operation, data backed up at different moments has different checkpoints, and data backed up at a checkpoint may be queried and obtained using the checkpoint. In another embodiment of the present disclosure, status data may be backed up using an output triggering mechanism, triggered by an output of a PE. As shown in FIG. 14, when a PE completes processing on input streams Input_Stream1 to Input_Stream5, and outputs a processing result Output_Stream1, a triggering module triggers a status data processing module, and the status data processing module then starts a new checkpoint to record latest status data of the PE into a memory or a magnetic disk. Such a triggering manner is precise and effective, has higher efficiency compared with a periodic triggering manner, and can avoid excessive resource consumption. The status data processing module may further clear historical data recorded at a previous checkpoint, thereby reducing intermediate data and effectively saving storage space.

Using the situation shown in FIG. 12 as an example, the following describes in detail a process of determining, according to a dependency relationship between an input stream and an output stream of a PE and status data, a target PE that needs to perform data recovery and a checkpoint for the target PE performing data recovery. If it is determined according to status data of {PE1, PE2, PE3, PE4, PE6, PE7} related to a to-be-adjusted data stream that the PE6 has not completed processing on a tuple $m_1$, or $O_2$ obtained after processing is performed on a tuple $m_1$ has not been sent to PE7, a downstream PE of PE6, it may be determined according to the foregoing dependency relationship between an input stream and an output stream that $i_1$, $i_3$, and $i_4$ on which $O_2$ depends need to be recovered, and PE1 that outputs $i_1$, $i_3$, and $i_4$ should complete data recovery, that is, a target PE that needs to recover data is PE1, and therefore a checkpoint at which $i_1$, $i_3$, and $i_4$ may be recovered may be determined. In this way, before the first worker node and the second worker node adjust deployment of PEs on the first worker node and the second worker node, the target PE may recover the data $i_1$, $i_3$, and $i_4$ according to the determined checkpoint, and after the first worker node and the second worker node complete adjustment, and the PEs distributed on the first worker node and the second worker node get ready, the target PE sends the recovered data $i_1$, $i_3$, and $i_4$ to a downstream PE of the target PE for processing, thereby ensuring that data loss does not occur in the upgrading process, and achieving an objective of lossless upgrading.

Optionally, before performing the steps of the foregoing streaming application upgrading method, the master node may further configure multiple PEs according to the initial logical model of the streaming application such that the multiple PEs process data of the streaming application.

According to the streaming application upgrading method provided in this embodiment of the present disclosure, a logical model of a streaming application is compared with an updated logical model of the streaming application, to dynamically determine a to-be-adjusted data stream, and a corresponding upgrading instruction is generated and delivered to a worker node, to complete online upgrading of the streaming application, thereby ensuring that a service does not need to be interrupted in an application upgrading process, and further, data is recovered in the upgrading process, to ensure that key data is not lost, and service running is not affected.

Figure 15:
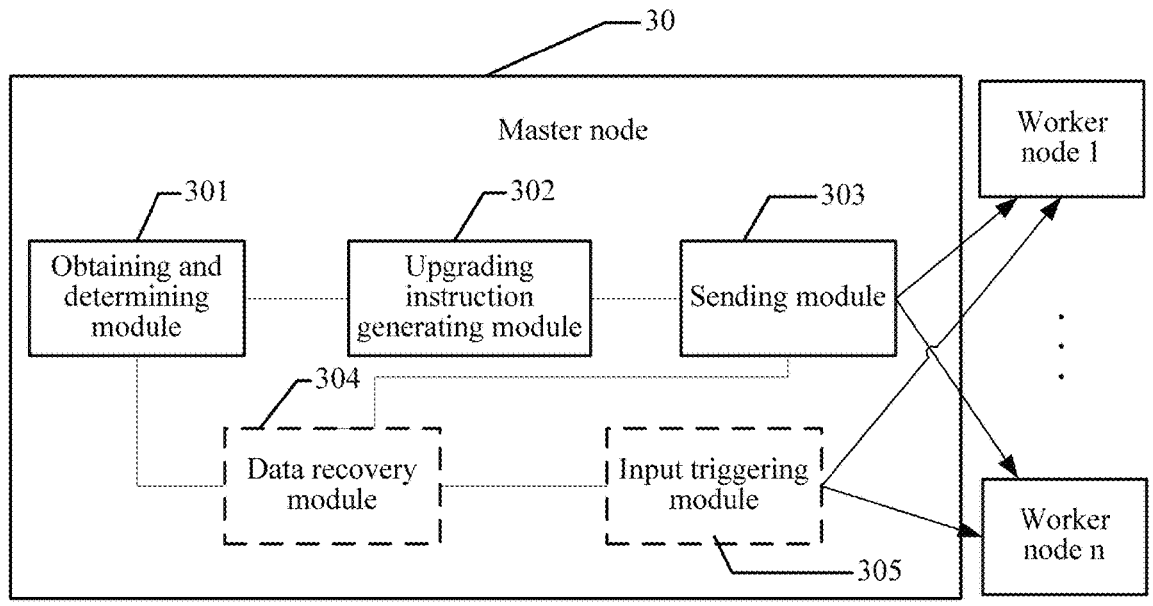
FIG. 15 is a schematic diagram of a master node according to an embodiment of the present disclosure.

Based on the foregoing method and system embodiments, an embodiment of the present disclosure further provides a master node in a stream computing system, where the master node may be a computer or a server, and the stream computing system further includes at least one worker node. Assuming that a streaming application is deployed in the stream computing system, multiple PEs are distributed on one or more worker nodes of the at least one worker node, and are configured to process data of the streaming application, where a logical model of the streaming application denotes the multiple PEs processing the data of the streaming application and a direction of a data stream between the multiple PEs, and after the streaming application is upgraded or updated the initial logical model of the streaming application is correspondingly updated. As shown in FIG. 15, the master node 30 includes an obtaining and determining module 301 configured to obtain an updated logical model of the streaming application when the streaming application is updated, and determine a to-be-adjusted data stream by comparing the updated logical model with the initial logical model, an upgrading instruction generating module 302 configured to generate an upgrading instruction according to the to-be-adjusted stream, and a sending module 303 configured to deliver the generated upgrading instruction to a first worker node such that the first worker node adjusts, according to an indication of the upgrading instruction, a direction of a data stream between PEs distributed on the first worker node, where the first worker node is one or more worker nodes of the at least one worker node included in the stream computing system, and the first worker node is a worker node at which a PE related to the to-be-adjusted data stream is located.

It should be noted that, there may be one or more to-be-adjusted data streams in this embodiment of the present disclosure, which depends on a specific situation. PEs related to each to-be-adjusted data stream refer to a source PE and a destination PE of the to-be-adjusted data stream, where the source PE of the to-be-adjusted data stream is a PE that outputs the to-be-adjusted data stream, the destination PE of the to-be-adjusted data stream is a PE receiving the to-be-adjusted data stream or a downstream PE of the source PE of the to-be-adjusted data stream.

According to the master node in the stream computing system that is provided in this embodiment of the present disclosure, a logical model of a streaming application is compared with an updated logical model of the streaming application, to dynamically determine a to-be-adjusted data stream, and a corresponding upgrading instruction is generated according to the to-be-adjusted data stream and delivered to a worker node, thereby upgrading the streaming application in the stream computing system online without interrupting a service.

Further, specific processing of the obtaining and determining module 301 varies with a type of a difference between the updated logical model and the initial logical model. For example, in an embodiment, the obtaining and determining module 301 is further configured to compare the initial logical model of the streaming application with the updated logical model, to determine the to-be-adjusted data stream, where the PEs denoted by the initial logical model of the streaming application are the same as PEs denoted by the updated logical model.

In another embodiment, the obtaining and determining module 301 is further configured to compare the initial logical model with the updated logical model, to determine a to-be-adjusted PE and the to-be-adjusted data stream, where the PEs denoted by the initial logical model of the streaming application are not completely the same as PEs denoted by the updated logical model. Correspondingly, in this case, the upgrading instruction generating module 302 is further configured to generate a first upgrading instruction according to the to-be-adjusted data stream determined by the obtaining and determining module 301, and generate a second upgrading instruction according to the to-be-adjusted PE determined by the obtaining and determining module 301. The sending module 303 is further configured to deliver the first upgrading instruction to a first worker node, and deliver the second upgrading instruction to a second worker node, where the second worker node includes a worker node at which the to-be-adjusted PE is located, the first upgrading instruction instructs the first worker node to adjust the direction of the data stream between the PEs distributed on the first worker node, and the second upgrading instruction instructs the second worker node to adjust a quantity of PEs distributed on the second worker node.

Further, in an embodiment, the master node 30 further includes a data recovery module 304 configured to determine, according to a dependency relationship between an input stream and an output stream of the PE related to the to-be-adjusted data stream, a target PE that needs to perform data recovery and a checkpoint for the target PE performing data recovery, where the sending module 303 is further configured to deliver a data recovery instruction to a worker node at which the target PE is located after the data recovery module 304 determines the target PE and the checkpoint, where the data recovery instruction instructs the target PE to recover data according to the checkpoint. It can be understood that, the data recovery instruction is constructed according to the target PE and the checkpoint that are determined by the data recovery module 304, and includes information indicating the checkpoint.

Correspondingly, the master node 30 further includes an input triggering module 305 configured to trigger the target PE determined by the data recovery module 304 to input the recovered data to a downstream PE of the target PE for processing after the first worker node completes adjustment, and the PEs distributed on the first worker node all get ready.

According to the master node in the stream computing system provided in this embodiment of the present disclosure, a logical model of a streaming application is compared with an updated logical model of the streaming application, to dynamically determine a to-be-adjusted data stream, and a corresponding upgrading instruction is generated and delivered to a worker node, to complete online upgrading of the streaming application, thereby ensuring that a service does not need to be interrupted in an application upgrading process, and further, data is recovered in the upgrading process, and therefore key data is not lost, and service running is not affected.

The master node in the stream computing system provided in the present disclosure is configured to implement the streaming application upgrading method in the foregoing method embodiment. For specific implementation of the master node, refer to the foregoing method embodiment, and details are not described herein again.

Figure 16:
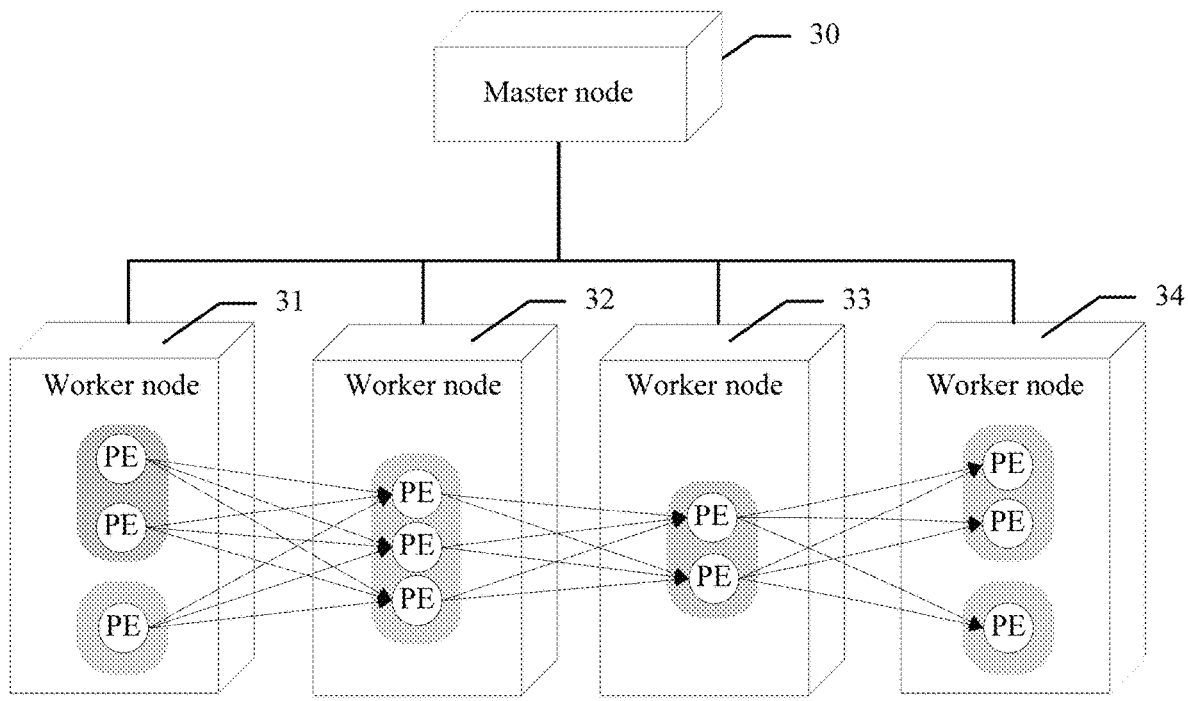
FIG. 16 is a schematic diagram of a stream computing system according to an embodiment of the present disclosure.

An embodiment of the present disclosure further provides a stream computing system configured to implement a streaming application upgrading method provided in an embodiment of the present disclosure. As shown in FIG. 16, the stream computing system includes a master node 30 and at least one worker node, such as worker nodes 31 to 34 in FIG. 16. The master node 30 configures, according to an initial logical model of a streaming application, multiple PEs to process a data stream of the streaming application, and the initial logical model of the streaming application denotes the multiple PEs processing data of the streaming application and a direction of a data stream between the multiple PEs. As shown in FIG. 16, the configured multiple PEs are distributed on one or more worker nodes. The master node 30 is configured to obtain an updated logical model of the streaming application, and determine a to-be-adjusted data stream by comparing the updated logical model with an initial logical model when a streaming application A is updated, generate an upgrading instruction according to the to-be-adjusted stream, and deliver the generated upgrading instruction to a first worker node, where the first worker node is one or more worker nodes of the at least one worker node included in the stream computing system, and the first worker node is a worker node at which a PE related to the to-be-adjusted data stream is located.

The first worker node is configured to receive the upgrading instruction sent by the master node 30, and adjust, according to an indication of the upgrading instruction, the direction of the data stream between the PEs distributed on the first worker node.

According to the stream computing system provided in this embodiment of the present disclosure, a logical model of a streaming application is compared with an updated logical model of the streaming application, to dynamically determine a to-be-adjusted data stream, and a corresponding upgrading instruction is generated and delivered to a worker node, to complete online upgrading of the streaming application, thereby ensuring that a service does not need to be interrupted in an application upgrading process.

Further, in an embodiment, the upgrading instruction includes at least one of an instruction for adding a PE, an instruction for deleting a PE, an instruction for updating a stream, an instruction for deleting a stream, and an instruction for adding a stream. Correspondingly, after receiving the upgrading instruction, the first worker node performs at least one of the following operations, adding a process element, deleting a process element, updating a stream, deleting a stream, and adding a stream such that PE deployment after the foregoing operation is performed (including a quantity of PEs and a dependency relationship between data streams between the PEs) matches the updated logical model of the streaming application.

In an embodiment, the master node 30 is further configured to compare the initial logical model of the streaming application with the updated logical model, to determine the to-be-adjusted data stream, where the PEs denoted by the initial logical model of the streaming application are the same as PEs denoted by the updated logical model.

In another embodiment, the master node 30 is further configured to compare the initial logical model of the streaming application with the updated logical model, to determine a to-be-adjusted PE and the to-be-adjusted data stream, where the PEs denoted by the initial logical model of the streaming application are not completely the same as PEs denoted by the updated logical model, generate a first upgrading instruction according to the to-be-adjusted data stream, generate a second upgrading instruction according to the to-be-adjusted PE, and deliver the first upgrading instruction to a first worker node, and deliver the second upgrading instruction to a second worker node, where the first worker node is a worker node at which a PE related to the to-be-adjusted data stream is located, and the second worker node includes a worker node at which the to-be-adjusted PE is located. Correspondingly, the first worker node is further configured to receive the first upgrading instruction sent by the master node 30, and adjust, according to an indication of the first upgrading instruction, the direction of the data stream between the PEs distributed on the first worker node, and the second worker node is configured to receive the second upgrading instruction sent by the master node 30, and adjust, according to an indication of the second upgrading instruction, a quantity of PEs distributed on the second worker node.

Preferably, in another embodiment, the master node 30 is further configured to determine, according to a dependency relationship between an input stream and an output stream of the PE related to the to-be-adjusted data stream, a target PE that needs to perform data recovery and a checkpoint for the target PE performing data recovery, deliver a data recovery instruction to a worker node at which the target PE is located, where the data recovery instruction is used to instruct the target PE to recover data according to the checkpoint, and trigger the target PE to input the recovered data to a downstream PE of the target PE for processing after the first worker node completes adjustment, and the PEs distributed on the first worker node all get ready.

It should be noted that, the stream computing system provided in the present disclosure is configured to implement this streaming application upgrading method in the foregoing method embodiment. For specific implementation of the stream computing system, refer to the foregoing method embodiment, and details are not described herein again. A PE in this embodiment of the present disclosure may exist in a form of software, such as a process, a thread, or a software function module, or may exist in a form of hardware, such as a processor core, or a logic circuit that has a data processing capability, and the functions described in this embodiment of the present disclosure are implemented by reading executable code or service processing logic in a memory, which is not particularly limited in the present disclosure.

Figure 17:
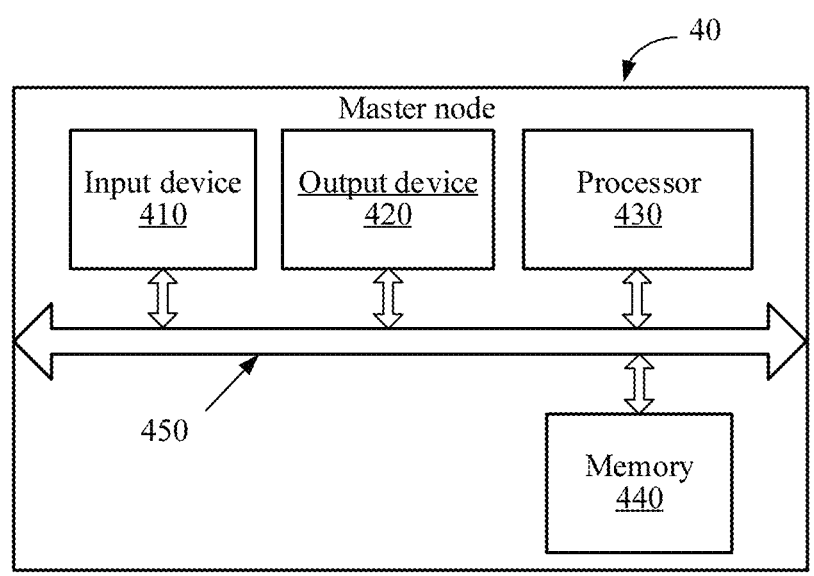
FIG. 17 is a schematic diagram of a master node according to an embodiment of the present disclosure.

An embodiment of the present disclosure further provides a master node in a stream computing system, where the master node may be a computer or a server. FIG. 17 is a schematic structural diagram of a master node 40 according to an embodiment of the present disclosure. The master node 40 may include an input device 410, an output device 420, a processor 430, and a memory 440.

The master node 40 provided in this embodiment of the present disclosure is applied to the stream computing system, the stream computing system further includes a worker node, and a streaming application is deployed in the stream computing system.

The memory 440 may include a read-only memory (ROM) and a random access memory (RAM), and provides an instruction and data to the processor 430. A part of the memory 440 may further include a non-volatile random access memory (NVRAM).

The memory 440 stores an operation instruction, an operating system (including various system programs implementing various basic services and processing a hardware-based task), an executable module, or a data structure, or a subset thereof, or an extension set thereof.

In this embodiment of the present disclosure, after the streaming application is updated, the processor 430 performs the following operations by invoking the operation instruction stored in the memory 440 (the operation instruction may be stored in the operating system) obtaining, using the input device 410, a updated logical model of a streaming application, and determining a to-be-adjusted stream by comparing the updated logical model with an initial logical model, generating an upgrading instruction according to the to-be-adjusted stream, and delivering the generated upgrading instruction to a first worker node, where the first worker node is one or more worker nodes of at least one worker node included in the stream computing system, and the first worker node is a worker node at which a PE related to the to-be-adjusted data stream is located.

According to the master node 40 provided in this embodiment of the present disclosure, a logical model of a streaming application is compared with an updated logical model of the streaming application in order to dynamically determine a to-be-adjusted data stream, and a corresponding upgrading instruction is generated and delivered to a worker node in order to complete online upgrading of the streaming application, thereby ensuring that a service does not need to be interrupted in an application upgrading process.

The processor 430 controls an operation of the master node 40, and the processor 430 may be further referred to as a central processing unit (CPU). The memory 440 may include a ROM and a RAM, and provides an instruction and data to the processor 430. A part of the memory 440 may further include an NVRAM. In a specific application, components of the master node 40 are coupled together using a bus system 450. In addition to a data bus, the bus system 450 may further include a power supply bus, a control bus, a status signal bus, and the like. However, for clear description, various types of buses in the figure are marked as the bus system 450.

The method disclosed in the foregoing embodiment of the present disclosure may be applied to the processor 430, or be implemented by the processor 430. The processor 430 may be an integrated circuit chip, and has a signal processing capability. During implementation, the steps of the foregoing method may be implemented using an integrated logic circuit of hardware in the processor 430 or implemented using an instruction in a software form. The processor 430 may be a general purpose processor, a digital signal processor (DSP), an application-specific integrated circuit (ASIC), a field programmable gate array (FPGA) or another programmable logical device, a discrete gate or a transistor logical device, or a discrete hardware component. The processor 430 may implement or execute methods, steps, and logical block diagrams disclosed in the embodiments of the present disclosure. A general purpose processor may be a microprocessor or the processor 430 may be any conventional processor or the like. Steps of the methods disclosed with reference to the embodiments of the present disclosure may be directly executed and completed by a hardware decoding processor, or may be executed and completed using a combination of hardware and software modules in the decoding processor. The software module may be located in a mature storage medium in the field, such as a RAM, a flash memory, a ROM, a programmable ROM (PROM), an electrically-erasable programmable memory, or a register. The storage medium is located in the memory 440, and the processor 430 reads information in the memory 440 and completes the steps in the foregoing methods in combination with hardware of the processor 430.

It should be understood that, the data backup and stream computing system disclosed in several embodiments provided in this application may be further implemented in other manners. For example, the apparatus embodiments described above are merely exemplary.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in network devices provided by the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method performed by a stream computing system, wherein the stream computing system comprises a master node and at least one worker node, wherein a plurality of process elements (PEs) are distributed on one or more worker nodes of the at least one worker node and are configured to process data of the streaming application, and wherein the method comprises:
    obtaining, by the master node, an updated logical model of the streaming application when the streaming application is updated, wherein an initial model of the streaming application denotes the plurality of PEs processing the data of the streaming application and a direction of a data stream between the plurality of PEs;
    determining a to-be-adjusted data stream by comparing the initial logical model of the streaming application with the updated logical model
    generating an upgrading instruction according to the to-be-adjusted data stream; and
    delivering the upgrading instruction to a first worker node, wherein the first worker node is a worker node at which a PE related to the to-be-adjusted data stream is located, and wherein the upgrading instruction instructs the first worker node to adjust a direction of a data stream between a plurality of PEs distributed on the first worker node;
    determining, by the master node a target PE to perform data recovery and a checkpoint for the target PE performing the data recovery according to a dependency relationship between an input stream and an output stream of a PE related to the to-be-adjusted data stream;
    delivering a data recovery instruction to a target worker node at which the target PE is located, wherein the data recovery instruction instructs the target PE to recover data according to the checkpoint; and
    triggering, by the master node, the target PE to input the recovered data to a downstream PE of the target PE for processing after the first worker node completes adjustment and a plurality of PEs distributed on the first worker node get ready.

2. The method of claim 1, wherein determining the to-be-adjusted data stream comprises comparing the initial logical model of the streaming application with the updated logical model in order to determine the to-be-adjusted data stream, and wherein the PEs denoted by the initial logical model of the streaming application are the same as PEs denoted by the updated logical model.

3. The method of claim 1, wherein the to-be-adjusted data stream comprises a to-be-updated data stream and a to-be-deleted data stream, and wherein determining the target PE that needs to perform the data recovery and the checkpoint for the target PE performing the data recovery comprises:
    determining, by the master node according to status data of a PE related to the to-be-updated data stream and the to-be-deleted data stream, the checkpoint for performing data recovery; and
    determining, according to a dependency relationship between an input stream and an output stream of the PE related to the to-be-updated data stream and the to-be-deleted data stream, the target PE that needs to perform the data recovery, wherein status data of each PE is backed up by the PE when being triggered by an output event and indicates a status in which the PE processes data.

4. The method of claim 1, wherein the to-be-adjusted PE comprises a to-be-added PE, wherein the second worker node is a worker node selected by the master node according to a load status of each worker node in the stream computing system, and wherein the second upgrading instruction instructs the second worker node to create the to-be-added PE.

5. The method of claim 1, wherein the to-be-adjusted PE comprises a to-be-deleted PE, wherein the second worker node is a worker node at which the to-be-deleted PE is located, and wherein the second upgrading instruction instructs the second worker node to delete the to-be-deleted PE.

6. The method of claim 1, further comprising configuring the plurality of PEs according to the initial logical model of the streaming application such that the plurality of PEs process the data of the streaming application.

7. The method of claim 1, wherein the initial logical model of the streaming application is denoted using a directed acyclic graph (DAG).

8. The method of claim 1, wherein the to-be-adjusted PE comprises a plurality of to-be-adjusted PEs, and wherein the plurality of to-be-adjusted PEs comprises to-be-added PEs and to-be-deleted PEs.

9. The method of claim 1, wherein determining the to-be-adjusted data stream comprises comparing the initial logical model of the streaming application with the updated logical model in order to determine a to-be-adjusted PE and the to-be-adjusted data stream, wherein the PEs denoted by the initial logical model of the streaming application are not completely the same as PEs denoted by the updated logical model, wherein generating the upgrading instruction comprises:
generating a first upgrading instruction according to the to-be-adjusted data stream; and
generating a second upgrading instruction according to the to-be-adjusted PE, and
wherein delivering the upgrading instruction to the first worker node comprises:
delivering the first upgrading instruction to the first worker node; and
delivering the second upgrading instruction to a second worker node, wherein the second worker node comprises a worker node at which the to-be-adjusted PE is located, wherein the first upgrading instruction instructs the first worker node to adjust the direction of the data stream between the PEs distributed on the first worker node, and wherein the second upgrading instruction instructs the second worker node to adjust a quantity of PEs distributed on the second worker node.

10. A master node performed by a stream computing system, wherein the stream computing system comprises at least one worker node, wherein a plurality of process elements (PEs) are distributed on one or more worker nodes of the at least one worker node and are configured to process data of the streaming application, and wherein the master node comprises:
a processor;
an input device coupled to the processor;
an output device coupled to the processor; and
a memory coupled to the processor and configured to store instructions, wherein the instructions cause the processor to be configured to:
obtain an updated logical model of the streaming application using the input device when the streaming application is updated, wherein an initial logical model of the streaming application denotes the plurality of PEs processing the data of the streaming application and a direction of a data stream between the plurality of PEs;
determine a to-be-adjusted data stream by comparing the initial logical model of the streaming application with the updated logical model;
generate an upgrading according to the to-be-adjusted data stream; and
deliver the updating instruction to a first worker node using the output device, wherein the first worker node is a worker node at which a PE related to the to-be-adjusted data stream is located, and wherein the updating instruction instructs the first worker node to adjust a direction of a data stream between a plurality of PEs distributed on the first worker node;
determine a target PE to perform data recovery and a checkpoint for the target PE performing the data recovery according to a dependency relationship between an input stream and an output stream of a PE related to the to-be-adjusted data stream;
deliver, using the output device, a data recovery instruction to a target worker node at which the target PE is located, wherein the data recovery instruction instructs the target PE to recover data according to the checkpoint; and
trigger the target PE to input the recovered data to a downstream PE of the target PE for processing when the first worker node completes adjustment and a plurality of PEs distributed on the first worker node get ready.

11. The master node of claim 10, wherein the instructions further cause the processor to be configured to compare the initial logical model of the streaming application with the updated logical model in order to determine the to-be-adjusted data stream, wherein the PEs denoted by the initial logical model of the streaming application are the same as PEs denoted by the updated logical model.

12. The master node of claim 11, wherein the to-be-adjusted data stream comprises a to-be-updated data stream and a to-be-deleted data stream, and wherein the instructions further cause the processor to be configured to:
determine, according to status data of a PE related to the to-be-updated data stream and the to-be-deleted data stream, the checkpoint for performing the data recovery; and
determine, according to a dependency relationship between an input stream and an output stream of the PE related to the to-be-updated data stream and the to-be-deleted data stream, the target PE that needs to perform the data recovery, wherein status data of each PE is backed up by the PE when being triggered by an output event, and indicates a status in which the PE processes data.

13. The master node of claim 10, wherein the to-be-adjusted PE comprises a to-be-deleted PE, wherein the second worker node is a worker node at which the to-be-deleted PE is located, and wherein the second upgrading instruction instructs the second worker node to delete the to-be-deleted PE.

14. The master node of claim 10, wherein the to-be-adjusted PE comprises a to-be-added PE, wherein the second worker node is a worker node selected by the master node according to a load status of each worker node in the stream computing system, and wherein the second upgrading instruction instructs the second worker node to create the to-be-added PE.

15. The master node of claim 10, wherein the to-be-adjusted PE comprises a plurality of to-be-adjusted PEs, and wherein the plurality of to-be-adjusted PEs comprises to-be-added PEs and to-be-deleted PEs.

16. The master node of claim 10, wherein the instructions further cause the processor to be configured to:
compare the initial logical model of the streaming application with the updated logical model, to determine a to-be-adjusted PE and the to-be-adjusted data stream, wherein the PEs denoted by the initial logical model of the streaming application are not completely the same as PEs denoted by the updated logical model;
generate a first upgrading instruction according to the to-be-adjusted data stream;
generate a second upgrading instruction according to the to-be-adjusted PE;
deliver the first upgrading instruction to the first worker node using the output device; and
deliver the second upgrading instruction to a second worker node using the output device, wherein the second worker node comprises a worker node at which the to-be-adjusted PE is located, wherein the first upgrading instruction instructs the first worker node to adjust the direction of the data stream between the plurality of PEs distributed on the first worker node, and wherein the second upgrading instruction instructs the second worker node to adjust a quantity of PEs distributed on the second worker node.

17. A stream computing system, comprising:
a master node; and
at least one worker node coupled to the master node,
wherein a plurality of process elements (PEs) are distributed on one or more worker nodes of the at least one worker node and are configured to process data of a streaming application deployed in the stream computing system,
wherein an initial logical model of the streaming application denotes the plurality of PEs processing the data of the streaming application and a direction of a data stream between the plurality of PEs,
wherein the master node is configured to:
  obtain an updated logical model of the streaming application when the streaming application is updated;
  determine a to-be-adjusted data stream by comparing the initial logical model of the streaming application with the updated logical model;
wherein the first worker node is configured to:
  receive the upgrading instruction from the master node; and
  adjust, according to an indication of the upgrading instruction, the direction of the data stream between the plurality of PEs distributed on the first worker node, and wherein the second worker node is configured to:
  receive the second upgrading instruction from the master node; and
  adjust, according to an indication of the second upgrading instruction, a quantity of PEs distributed on the second worker node, and
wherein the master node is further configured to:
  determine a target PE that needs to perform data recovery and a checkpoint for the target PE performing data recovery according to a dependency relationship between an input stream and an output stream of a PE related to the to-be-adjusted data stream;
  deliver a data recovery instruction to a target worker node at which the target PE is located, wherein the data recovery instruction instructs the target PE to recover data according to the checkpoint; and
  trigger the target PE to input the recovered data to a downstream PE of the target PE for processing after the first worker node completes adjustment and a plurality of PEs distributed on the first worker node get ready.

18. The stream computing system of claim 17, wherein the master node is further configured to compare the initial logical model of the streaming application with the updated logical model in order to determine the to-be-adjusted data stream, and wherein the PEs denoted by the initial logical model of the streaming application are the same as PEs denoted by the updated logical model.

19. The stream computing system of claim 17, wherein the to-be-adjusted PE comprises a plurality of to-be-adjusted PEs, and wherein the plurality of to-be-adjusted PEs comprises to-be-added PEs and to-be-deleted PEs.

* * * * *

UNITED STATES PATENT AND TRADEMARK OFFICE
CERTIFICATE OF CORRECTION

PATENT NO. : 10,785,272 B2
APPLICATION NO. : 15/492392
DATED : September 22, 2020
INVENTOR(S) : Sibao Hong, Mingzhen Xia and Songshan Zhang It is certified that error appears in the above-identified patent and that said Letters Patent is hereby corrected as shown below:

In the Claims

Claim 1, Column 23, Line 52: "an initial model" should read "an initial logical model"

Signed and Sealed this
Tenth Day of November, 2020

Andrei Iancu
*Director of the United States Patent and Trademark Office*